(12) United States Patent
Maamari et al.

(10) Patent No.: US 12,470,331 B2
(45) Date of Patent: Nov. 11, 2025

(54) CARRIER SWITCHING IN HYBRID AUTOMATIC REPEAT REQUESTS

(71) Applicant: QUALCOMM Incorporated, San Diego, CA (US)

(72) Inventors: Diana Maamari, San Diego, CA (US); Ahmed Elshafie, San Diego, CA (US); Wei Yang, San Diego, CA (US); Huilin Xu, Temecula, CA (US)

(73) Assignee: Qualcomm Incorporated, San Diego, CA (US)

( * ) Notice: Subject to any disclaimer, the term of this patent is extended or adjusted under 35 U.S.C. 154(b) by 400 days.

(21) Appl. No.: 18/062,073

(22) Filed: Dec. 6, 2022

(65) Prior Publication Data

US 2024/0187144 A1 Jun. 6, 2024

(51) Int. Cl.
*H04L 1/1829* (2023.01)
*H04L 5/00* (2006.01)

(52) U.S. Cl.
CPC .......... *H04L 1/1861* (2013.01); *H04L 1/1854* (2013.01); *H04L 5/0055* (2013.01)

(58) Field of Classification Search
CPC ... H04L 1/1861; H04L 1/1854; H04L 5/0055; H04L 5/001

USPC .......................................................... 370/329
See application file for complete search history.

(56) References Cited

U.S. PATENT DOCUMENTS

| | | | | |
|---|---|---|---|---|
| 2015/0103703 | A1* | 4/2015 | Zeng | H04W 72/23 370/280 |
| 2016/0323071 | A1* | 11/2016 | Berggren | H04L 5/0055 |
| 2021/0219329 | A1* | 7/2021 | Zhou | H04L 1/1819 |
| 2024/0023098 | A1* | 1/2024 | Wang | H04W 72/232 |
| 2024/0381359 | A1* | 11/2024 | Chien | H04L 1/1854 |

\* cited by examiner

*Primary Examiner* — Mang Hang Yeung
(74) *Attorney, Agent, or Firm* — Harrity & Harrity, LLP

(57) ABSTRACT

Wireless communications systems, apparatuses, and methods are provided. A method of wireless communication performed by a user equipment (UE) includes receiving, from a network unit via a single physical downlink control channel (PDCCH) communication, a configuration scheduling multiple physical downlink shared channel (PDSCH) communications; transmitting, to the network unit via a first cell, a first physical uplink control channel (PUCCH) communication comprising acknowledgement/negative acknowledgement (ACK/NACK) feedback associated with a first subset of the multiple PDSCH communications; and transmitting, to the network unit, via a second cell, a second PUCCH communication comprising ACK/NACK feedback associated with a second subset of the multiple PDSCH communications, wherein the second cell is different from the first cell.

30 Claims, 9 Drawing Sheets

CARRIER SWITCHING IN HYBRID AUTOMATIC REPEAT REQUESTS

TECHNICAL FIELD

This application relates to wireless communication systems, and more particularly, to carrier switching for hybrid automatic repeat requests (HARQ) in wireless communication systems.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing may extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR may be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a user equipment (UE) may include receiving, from a network unit via a single physical downlink control channel (PDCCH) communication, a configuration scheduling multiple physical downlink shared channel (PDSCH) communications; transmitting, to the network unit via a first cell, a first physical uplink control channel (PUCCH) communication comprising acknowledgement/negative acknowledgement (ACK/NACK) feedback associated with a first subset of the multiple PDSCH communications; and transmitting, to the network unit, via a second cell, a second PUCCH communication comprising ACK/NACK feedback associated with a second subset of the multiple PDSCH communications, wherein the second cell is different from the first cell.

In an additional aspect of the disclosure, a method of wireless communication performed by a network unit may include transmitting, to a user equipment (UE) via a single physical downlink control channel (PDCCH) communication, a configuration scheduling multiple physical downlink shared channel (PDSCH) communications; receiving, from the UE via a first cell, a first physical uplink control channel (PUCCH) communication comprising acknowledgement/negative acknowledgement (ACK/NACK) feedback associated with a first subset of the multiple PDSCH communications; and receiving, from the UE via a second cell, a second PUCCH communication comprising ACK/NACK feedback associated with a second subset of the multiple PDSCH communications, wherein the second cell is different from the first cell.

In an additional aspect of the disclosure, a user equipment (UE) may include a memory; a transceiver; and at least one processor coupled to the memory and the transceiver, wherein the UE is configured to receive, from a network unit via a single physical downlink control channel (PDCCH) communication, a configuration scheduling multiple physical downlink shared channel (PDSCH) communications; transmit, to the network unit via a first cell, a first physical uplink control channel (PUCCH) communication comprising acknowledgement/negative acknowledgement (ACK/NACK) feedback associated with a first subset of the multiple PDSCH communications; and transmit, to the network unit, via a second cell, a second PUCCH communication comprising ACK/NACK feedback associated with a second subset of the multiple PDSCH communications, wherein the second cell is different from the first cell.

In an additional aspect of the disclosure, a network unit may include a memory; a transceiver; and at least one processor coupled to the memory and the transceiver, wherein the network unit is configured to transmit, to a user equipment (UE) via a single physical downlink control channel (PDCCH) communication, a configuration scheduling multiple physical downlink shared channel (PDSCH) communications; receive, from the UE via a first cell, a first physical uplink control channel (PUCCH) communication comprising acknowledgement/negative acknowledgement (ACK/NACK) feedback associated with a first subset of the multiple PDSCH communications; and receive, from the UE via a second cell, a second PUCCH communication comprising ACK/NACK feedback associated with a second subset of the multiple PDSCH communications, wherein the second cell is different from the first cell.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention may include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances may be implemented in various devices, systems, and methods.

DETAILED DESCRIPTION

Figure 1:
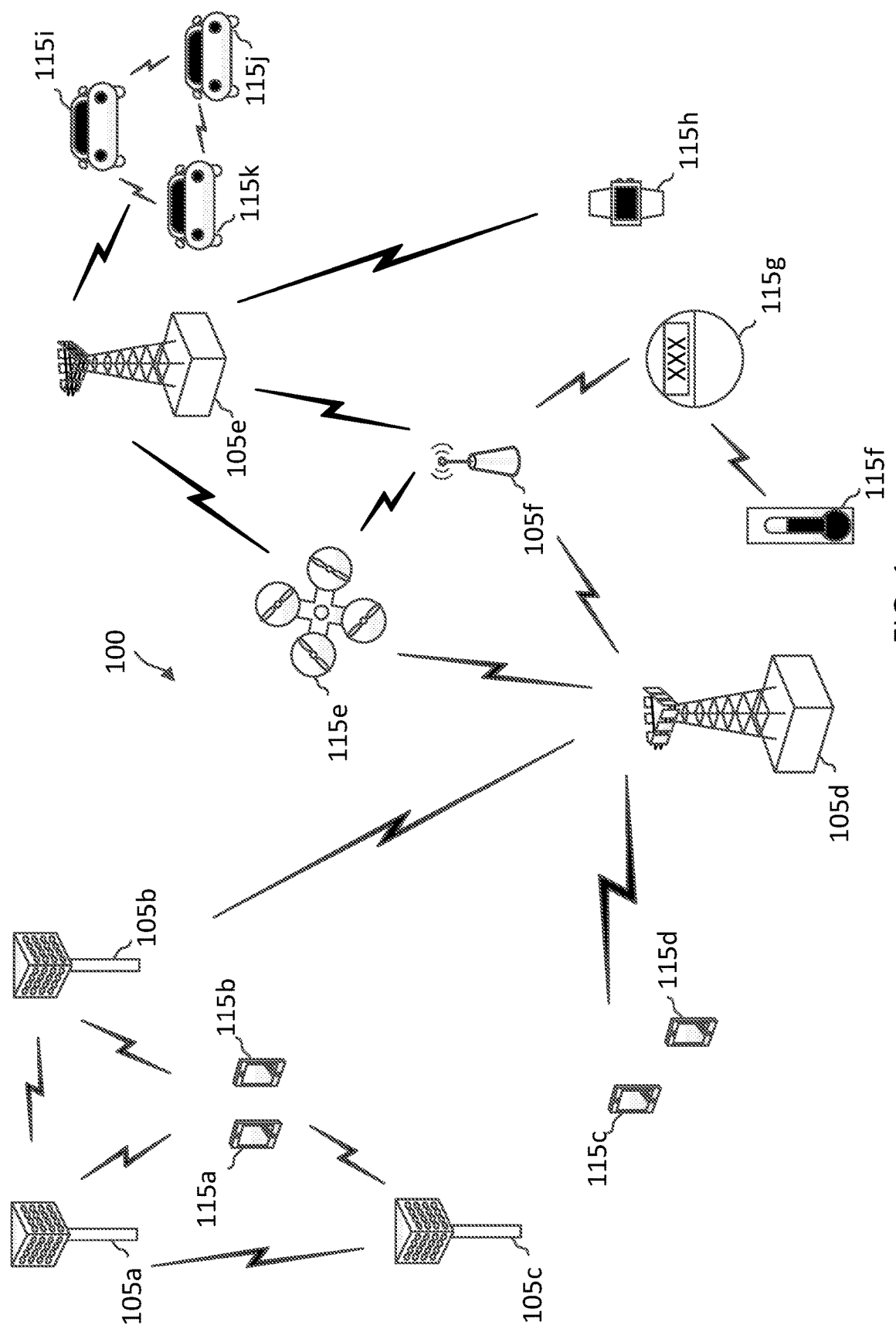
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD/TDD implementations, subcarrier spacing may occur with 15 kHz, for example over 5, 10, 20 MHZ, and the like bandwidth (BW). For other various outdoor and small cell coverage deployments of TDD greater than 3 GHZ, subcarrier spacing may occur with 30 kHz over 80/100 MHZ BW. For other various indoor wideband implementations, using a TDD over the unlicensed portion of the 5 GHz band, the subcarrier spacing may occur with 60 KHz over a 160 MHz BW. Finally, for various deployments transmitting with mmWave components at a TDD of 28 GHZ, subcarrier spacing may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHZ bands allows for hundreds of megahertz (MHz) of bandwidth (BW) available for unlicensed band communications. Additionally, NR-U may also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNII) radio band has a minimum OCB requirement of about at least 70 percent (%).

Some sidelink systems may operate over a 20 MHz bandwidth, e.g., for listen before talk (LBT) based channel accessing, in an unlicensed band. A BS may configure a sidelink resource pool over one or multiple 20 MHZ LBT sub-bands for sidelink communications. A sidelink resource pool is typically allocated with multiple frequency subchannels within a sidelink band width part (SL-BWP) and a sidelink UE may select a sidelink resource (e.g., one or multiple subchannel) in frequency and one or multiple slots in time) from the sidelink resource pool for sidelink communication.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Various aspects relate generally to wireless communication and more particularly to signaling for dynamic waveform switching. Some aspects more specifically relate to a network unit signaling a user equipment (UE) to switch between a first waveform type and a second waveform type for uplink communications. In some examples, a network unit may transmit an indicator to the UE to enable switching between the waveform types. When waveform switching is enabled, the network unit may transmit DCI to the UE indicating which waveform type to use for uplink communications. In some examples, the size of the DCI may be the same size for the first waveform type and the second waveform type. As such, the UE may blind decode the DCI using a common DCI size for the first waveform type and the second waveform type. The DCI may further include scheduled resources for a physical uplink shared channel (PUSCH) communication associated with the UE. The UE may transmit PUSCH communications to the network unit via the scheduled resources using the indicated waveform type.

Additionally or alternatively, the UE may switch between the first waveform type and the second waveform type on a semi-static basis. In some examples, a network unit may transmit an indicator to the UE to enable switching between the waveform types. When waveform switching is enabled, the network unit may transmit non-uplink scheduling DCI and/or a MAC-CE communication to the UE indicating which waveform type to use for uplink communications. The network unit may subsequently transmit uplink scheduling DCI to the UE using a DCI size associated with the previously indicated waveform type. The DCI size associated with the first waveform type may be different from the DCI associated with the second waveform type. As such, the UE may blind decode the DCI based on the DCI size associated with the indicated waveform type. The UE may transmit PUSCH communications to the network unit via the scheduled resources using the indicated waveform type.

Particular aspects of the subject matter described in this disclosure may be implemented to realize one or more of the following potential advantages. In some examples, by implementing dynamic waveform switching according to embodiments of the present disclosure, the described techniques may be used to reduce computing resources, memory requirements, latency, and/or power consumption in the UE by blind decoding a DCI having a common size for the first and second waveform types as compared to blind decoding a first DCI associated with the first waveform type and blind decoding a second, different sized DCI associated with the second waveform type. The dynamic waveform switching according to embodiments of the present disclosure may increase network coverage and/or network capacity. For example, the UE may switch to transmitting uplink communications using a DFT-s-OFDM waveform to increase range and coverage. In some examples, the UE may switch to transmitting uplink communications using a CP-OFDM waveform to increase throughput and/or data rate.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspects, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IOT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105c, or in multi-hop configurations by communicating with another user device which relays its information to the network, such as the UE 115f communicating temperature measurement information to the smart meter, the UE 115g, which is then reported to the network through the small cell BS 105f. In some aspects, the UE 115h may harvest energy from an ambient environment associated with the UE 115h. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes, for example, about 10. Each subframe may be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 may perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 may enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115 may receive an indicator from the BS 105 indicating dynamic waveform switching between a first waveform type and a second waveform type. The UE 115 may monitor, based on the indicator, for downlink control information (DCI) from the network unit, wherein at least one of a size of the DCI, a size of a bitfield of the DCI, or a location of the bitfield of the DCI is interpreted based on the indicator.

In some aspects, the UE 115 may receive, from the BS 105 via a single physical downlink control channel (PDCCH) communication, a configuration scheduling multiple physical downlink shared channel (PDSCH) communications. In some aspects, the UE 115 may transmit, to the BS 105 via a first cell, a first physical uplink control channel (PUCCH) communication comprising acknowledgement/ negative acknowledgement (ACK/NACK) feedback associated with a first subset of the multiple PDSCH communications. In some aspects, the UE 115 may transmit, to the BS 105 via a second cell, a second PUCCH communication comprising ACK/NACK feedback associated with a second subset of the multiple PDSCH communications. The second cell may be different from the first cell.

Figure 2:
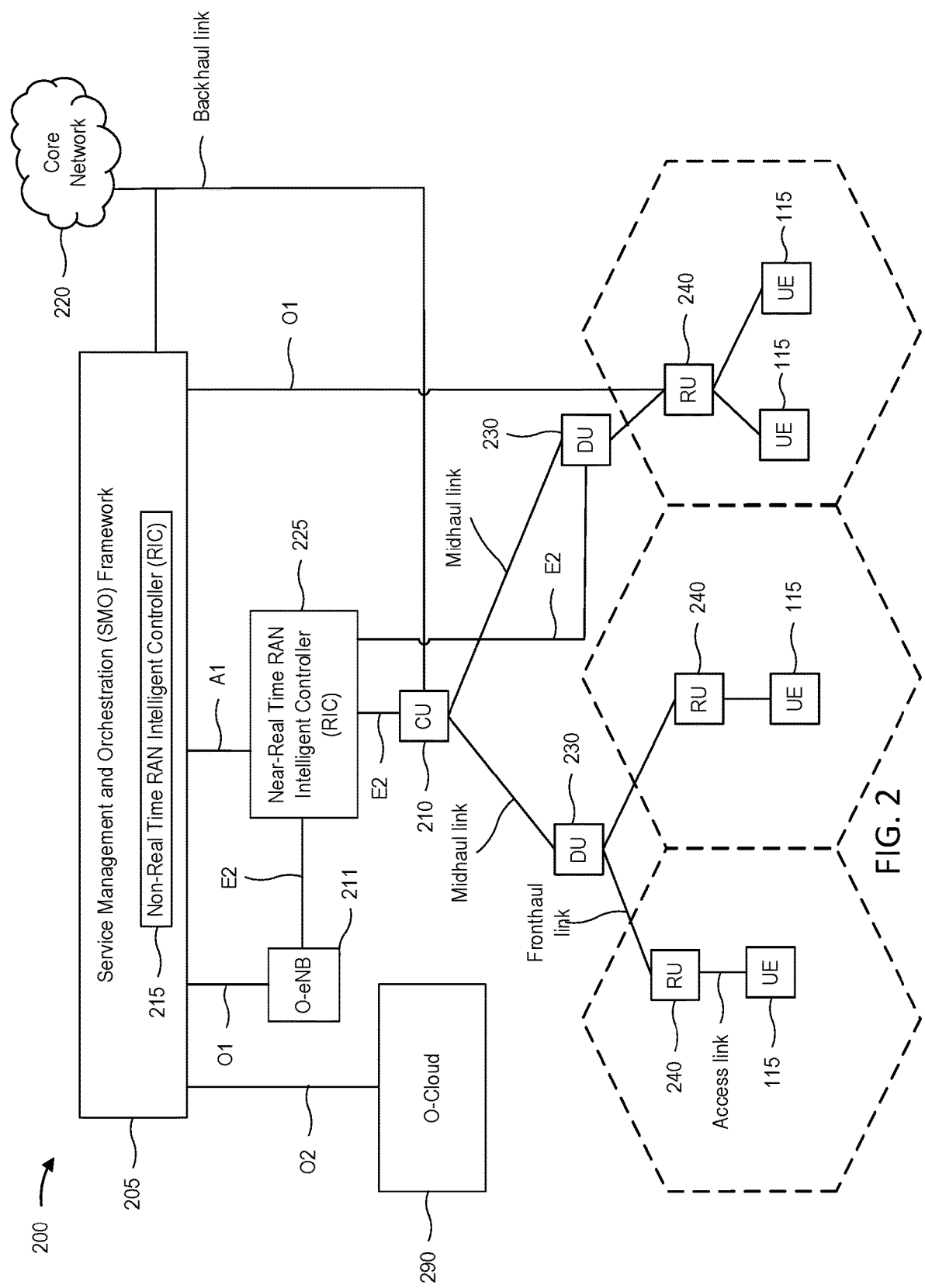
FIG. 2 illustrates an example disaggregated base station architecture according to some aspects of the present disclosure.

FIG. 2 shows a diagram illustrating an example disaggregated base station 200 architecture. The disaggregated base station 200 architecture may include one or more central units (CUs) 210 that may communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 may be logically split into one or more CU-UP units and one or more CU-CP units. The CU-UP unit may communicate bidirectionally with the CU-CP unit via an interface, such as the E1 interface when implemented in an O-RAN configuration. The CU 210 may be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) may be implemented with an interface configured to communicate signals with other layers (and modules) hosted by the DU 230, or with the control functions hosted by the CU 210.

Lower-layer functionality may be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 may be implemented to handle over the air (OTA) communication with one or more UEs 115. In some implementations, real-time and non-real-time aspects of control and user plane communication with the RU(s) 240 may be controlled by the corresponding DU 230. In some scenarios, this configuration may enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements may include CUs 210, DUs 230, RUs 240 and Near-RT RICs 225. In some implementations, the SMO Framework 205 may communicate with a hardware aspect of a 4G RAN, such as an open eNB (O-cNB) 211, via an O1 interface. Additionally, in some implementations, the SMO Framework 205 may communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-cNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In some aspects, the UE 115 may receive an indicator from the RU 240 indicating dynamic waveform switching between a first waveform type and a second waveform type. The UE 115 may monitor, based on the indicator, for downlink control information (DCI) from the RU 240, wherein at least one of a size of the DCI, a size of a bitfield of the DCI, or a location of the bitfield of the DCI is interpreted based on the indicator.

In some aspects, the UE 115 may receive, from the RU 240 via a single physical downlink control channel (PDCCH) communication, a configuration scheduling multiple physical downlink shared channel (PDSCH) communications. In some aspects, the UE 115 may transmit, to the DU 230 via a first cell, a first physical uplink control channel (PUCCH) communication comprising acknowledgement/negative acknowledgement (ACK/NACK) feedback associated with a first subset of the multiple PDSCH communications. In some aspects, the UE 115 may transmit, to the DU 230 via a second cell, a second PUCCH communication comprising ACK/NACK feedback associated with a second subset of the multiple PDSCH communications. The second cell may be different from the first cell.

Figure 3:
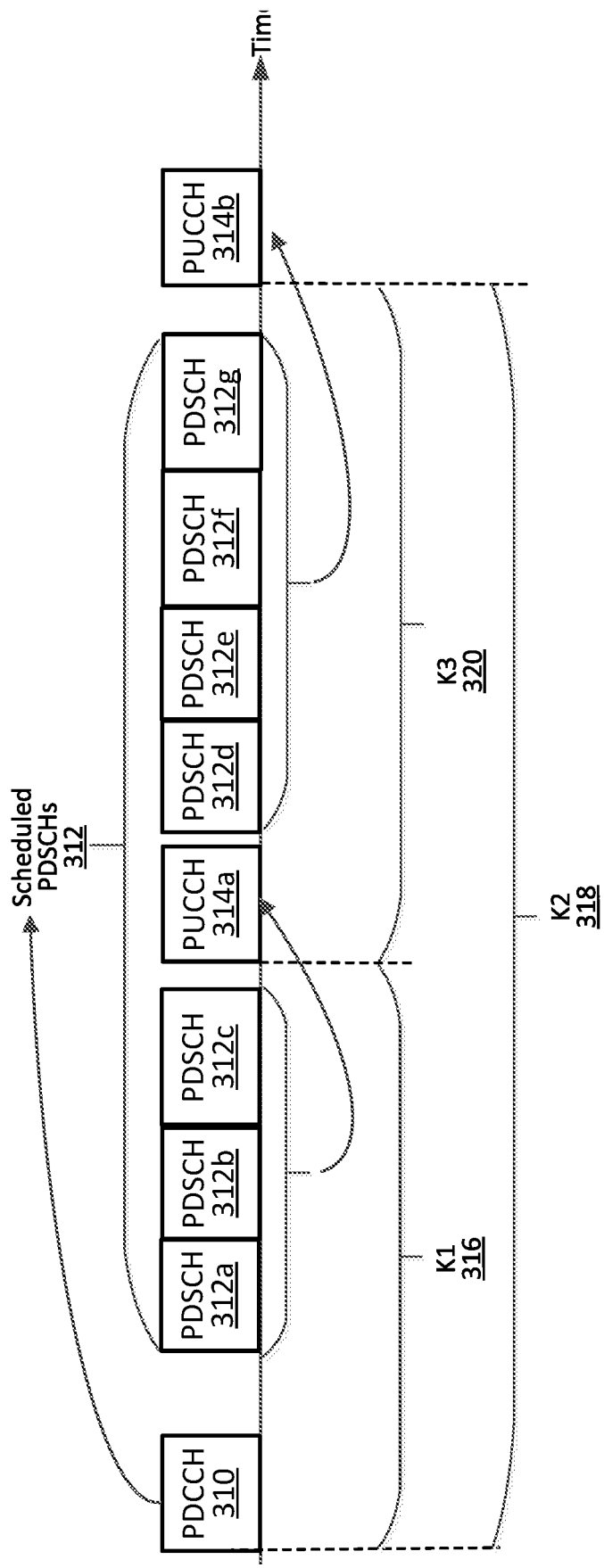
FIG. 3 illustrates resources associated with low latency HARQ feedback according to some aspects of the present disclosure.

FIG. 3 illustrates resources associated with low latency HARQ feedback according to some aspects of the present disclosure. In FIG. 3, the horizontal axis may represent time in some arbitrary units. In some aspects, a UE (e.g., the UE 115 or the UE 600) may receive a configuration from a network unit (e.g., the network unit 700, the BS 105, the RU 240, the DU 230, and/or the CU 210) scheduling multiple physical downlink shared channel (PDSCH) communications 312. In this regard, the UE may receive the configuration via a single physical downlink control channel (PDCCH) communication 310. In some aspect, the single PDCCH communication 310 may include downlink control information (DCI) scheduling the multiple PDSCH communications 312.

In some aspects, the UE may transmit a first physical uplink control channel (PUCCH) communication 314a to the network unit. The first PUCCH communication 314a may include acknowledgement/negative acknowledgement (ACK/NACK) feedback associated with a first subset of the multiple PDSCH communications 312a-312c. The first PUCCH communication 314a may indicate for each PDSCH of the first subset of PDSCHs 312a-312c whether each of PDSCHs 312a-312c was correctly received by the UE (e.g., ACK) or not correctly received (e.g., NACK). The UE may transmit the first PUCCH 314a to the network unit via a first cell. In some aspects, the UE configuration received from the network unit may include an identifier of the first cell. The first cell may be a primary cell (PCell) for a master cell group (MCG) and/or a primary secondary cell (PSCell) for a secondary cell group (SCG).

In some aspects, the UE may receive an indicator indicating a number of PDSCH communications (e.g., 1, 2, 3, 4, or more PDSCH communications) in the first subset of the multiple PDSCH communications 312a-312c. In this regard, the UE may receive the indicator of the number of PDSCH communications in the first subset of PDSCH communications via at least one of the single PDCCH communication 310, a radio resource control (RRC) communication, a medium access control control element (MAC-CE) communication, a second PDCCH communication, or other suitable communication.

Additionally or alternatively, the UE may receive an indicator indicating a number of transport blocks (TBs) (e.g., 1, 2, 3, 4, or more TBs) in the first subset of the multiple PDSCH communications 312a-312c. In this regard, the UE may receive the indicator of the number of TBs in the first subset of PDSCH communications via at least one of the single PDCCH communication, a radio resource control (RRC) communication, a medium access control control element (MAC-CE) communication, a second PDCCH communication, or other suitable communication.

In some aspects, the configuration may further indicate at least one of first time resources, first frequency resources, and/or first beam resources associated with the first PUCCH communication 314a. For example, the first time resources may include a slot indicator (e.g., slot index) and/or a symbol indicator (e.g., symbol index) in which the UE transmits the first PUCCH communication 314a. The configuration may further indicate a first time offset K1 316 from the single PDCCH communication 310 to the first PUCCH communication 314a. During the first time offset K1 316, the UE may monitor for the first subset of PDSCH communications 312a-312c and prepare the HARQ ACK/NACK (e.g., type 1 HARQ ACK/NACK and/or type 2 HARQ ACK/NACK) feedback for transmission in the first PUCCH communication 314a. The time offset K1 316 may be indicated as a number of slots, a number of symbols, a number of milliseconds, or other suitable time period.

The first frequency resources may include subchannel(s), subband(s), component carrier(s), and/or frequency interlace(s) in which the UE transmits the first PUCCH communication 314a. The first beam resources may include antenna beam(s) in which the UE transmits the first PUCCH communication 314a. The antenna beam(s) may be directional beam(s) for transmitting the first PUCCH communication 314a in the direction of the first cell.

In some aspects, the UE may transmit a first index to the network unit indicating the first subset of the multiple PDSCH communications 312a-312c. The UE may transmit the first index to the network unit indicating the first subset of the multiple PDSCH communications 312a-312c via the first PUCCH communication 314a. The index may include a bit pattern indicating which PDSCH communications are being acknowledged or negatively acknowledged by the first PUCCH communication 314a.

In some aspects, the UE may transmit a second PUCCH communication 314b to the network unit. The second PUCCH communication 314b may include ACK/NACK feedback associated with a second subset of the multiple PDSCH communications 312d-312g. The second PUCCH 314b may indicate for each PDSCH 312 of the second subset of PDSCHs 312d-312g whether each PDSCH 312 was correctly received by the UE (e.g., ACK) or not correctly received (e.g., NACK). The UE may transmit the second PUCCH 314b to the network unit via a second cell. The second cell may be different from the first cell. In some aspects, the configuration received from the network unit may include an identifier of the second cell. The second cell may be a secondary cell (SCell) for a secondary cell group (SCG). In some aspect, the second cell may operate in LTE mode while the first cell operates in 5G NR mode. Additionally or alternatively, the first cell may operate in LTE mode while the second cell operates in 5G NR mode. In some aspects, the first and second cells may be different RUs (e.g., RU 240) of the same network unit (e.g., the same DU 230). In some aspects, the first and second cells may be different RUs (e.g., RU 240) of different network units (e.g., different DU 230s).

In some aspects, the UE may receive an indicator indicating a number of PDSCH communications (e.g., 1, 2, 3, 4, or more PDSCH communications) in the second subset of the multiple PDSCH communications 312d-312g. In this regard, the UE may receive the indicator of the number of PDSCH communications in the second subset of PDSCH communications 312d-312g via at least one of the single PDCCH communication 310, a radio resource control (RRC) communication, a medium access control control element (MAC-CE) communication, a second PDCCH communication, or other suitable communication.

Additionally or alternatively, the UE may receive an indicator indicating a number of transport blocks (TBs) (e.g., 1, 2, 3, 4, or more TBs) in the second subset of the multiple PDSCH communications 312d-312g. In this regard, the UE may receive the indicator of the number of TBs in the second subset of PDSCH communications 312d-312g via at least one of the single PDCCH communication 310, a radio resource control (RRC) communication, a medium access control control element (MAC-CE) communication, a second PDCCH communication, or other suitable communication.

In some aspects, the configuration may further indicate at least one of second time resources, second frequency resources, or second beam resources associated with the second PUCCH communication 314b. For example, the second time resources may include a slot indicator (e.g., slot index) and/or a symbol indicator (e.g., symbol index) in which the UE transmits the second PUCCH communication 314b. The configuration may further indicate a second time offset K2 318 from the single PDCCH communication 310 to the second PUCCH communication 314b. Additionally or alternatively, the second time offset may be offset K3 320 from the first PUCCH communication 314a to the second PUCCH communication 314b. During the second time offset the UE may monitor for the second subset of PDSCH communications 312d-312g and prepare the HARQ ACK/NACK (e.g., type 1 HARQ ACK/NACK and/or type 2 HARQ ACK/NACK) feedback for transmission in the second PUCCH communication 314b. The time offset may be indicated as a number of slots, a number of symbols, a number of milliseconds, or other suitable time period.

The second frequency resources may include subchannel(s), subband(s), component carrier(s), and/or frequency interlaces in which the UE transmits the second PUCCH communication 314b. The second beam resources may include antenna beam(s) in which the UE transmits the second PUCCH communication 314b. The antenna beam(s) may be directional beam(s) for transmitting the second PUCCH communication 314b in the direction of the second cell.

In some aspects, the UE may transmit a second index to the network unit indicating the second subset of the multiple PDSCH communications 312d-312g. The UE may transmit the second index to the network unit indicating the ACK/NACK for the second subset of the multiple PDSCH communications 312d-312g. The second index may be a bit pattern indicating which PDSCH communications 312 are being acknowledged or negatively acknowledged by the second PUCCH communication. 314b The first PUCCH communication 314a may use a codebook different from the codebook used for the second PUCCH communication 314b.

In some aspects, the UE may transmit the first PUCCH communication 314a before transmitting the second PUCCH communication 314b. In this regard, the UE may transmit the first PUCCH communication 314a before transmitting the second PUCCH communication 314b based on a latency budget associated with the first subset of PDSCH communications 312a-312c. For example, the first subset of PDSCH communications 312a-312c may have a latency budget based on the associated application (e.g., extended reality application, ultra-reliable low-latency communication (URLLC) application, vehicle-to-everything (V2X) application, etc.). Transmitting the first PUCCH communication 314a before the second PUCCH communication 314b may allow for faster retransmissions of PDSCH communications 312 that were not correctly received by the UE.

In some aspects, the UE may receive the first subset 312a-312c and second subset 312d-312g of the multiple PDSCH communications from the network unit. In this regard, the UE may receive the first subset 312a-312c and second subset of the multiple PDSCH communications 312d-312g via the first cell and/or the second cell. The UE may transmit the first PUCCH communication 314a after receiving the first subset of PDSCH communications 312a-312c and before receiving the second subset of PDSCH communications 312d-312g. The UE may transmit the second PUCCH communication 314b after receiving the second subset of PDSCH communications 312d-312g. Although the present disclosure describes two subsets of PDSCH communications 312 being acknowledged in two PUCCH communications 314a and 314b, the present disclosure is not so limited and any number of PDSCH communications 312 may be acknowledged by any number of PUCCH communications 314 via any number of cells.

In some aspects, the UE may transmit a third PUCCH communication 314 to the network unit comprising the ACK/NACK feedback associated with the first subset of the multiple PDSCH communications 312a-312c. The UE may transmit the third PUCCH communication 314 via the first cell and/or the second cell. Retransmitting the ACK/NACK feedback associated with the first subset of the multiple PDSCH communications 312a-312c in a third PUCCH communication 314 may increase the probability of correct reception of the ACK/NACK feedback by the network unit. Additionally or alternatively, the UE may transmit a fourth PUCCH communication 314 to the network unit comprising the ACK/NACK feedback associated with the second subset of the multiple PDSCH communications 312d-312g. The UE may transmit the fourth PUCCH communication 314 via the first cell and/or the second cell. Retransmitting the ACK/NACK feedback associated with the second subset of the multiple PDSCH communications 312d-312g in a fourth PUCCH communication 314 may increase the probability of correct reception of the ACK/NACK feedback by the network unit.

In some aspects, the UE may transmit the second PUCCH communication 314b to the network unit via the second cell further comprising the ACK/NACK feedback associated with the first subset of the multiple PDSCH communications 312a-312c. In this case, the first PUCCH communication 314a may include ACK/NACK feedback associated with the first subset of the multiple PDSCH communications 312a-312c and the second PUCCH communication 314b may include ACK/NACK feedback associated with the first subset 312a-312c and second subset 312d-312g of the multiple PDSCH communications.

Figure 4:
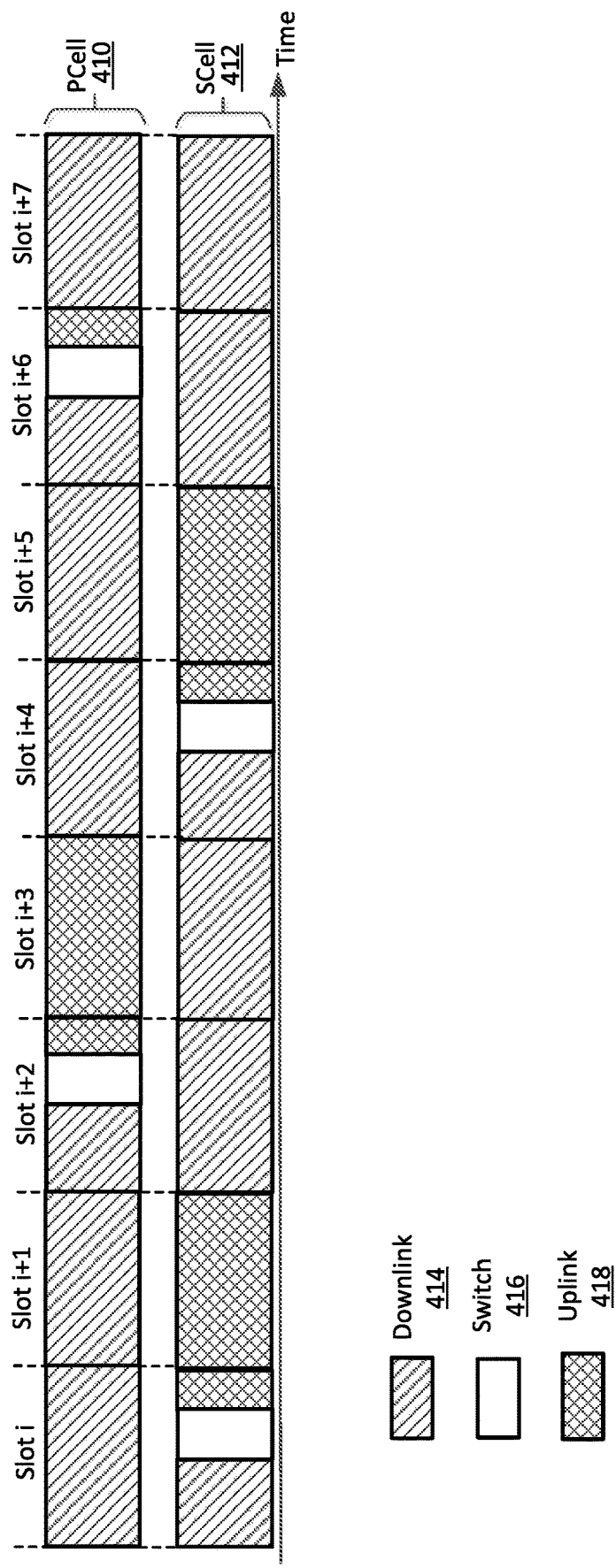
FIG. 4 illustrates a timeline for carrier switching according to some aspects of the present disclosure.

FIG. 4 illustrates a timeline for carrier switching according to some aspects of the present disclosure. In FIG. 4, the horizontal axis may represent time in some arbitrary units. The top timeline illustrates a downlink 414, switching 416, and uplink 418 timeline configuration for a PCell 410. The bottom timeline illustrates a downlink 414, switching 416, and uplink 418 timeline configuration for a SCell 412. In some aspects, a UE may transmit a first PUCCH communication to a network unit. The first PUCCH communication may include acknowledgement/negative acknowledgement (ACK/NACK) feedback associated with a first subset of the multiple PDSCH communications. The UE may transmit the first PUCCH to the network unit via PCell 410. In some aspects, the configuration received from the network unit may include an identifier of the PCell 410. The PCell 410 may be a primary cell (PCell) for a master cell group (MCG).

In some aspects, the UE may transmit a second PUCCH communication to the network unit. The second PUCCH communication may include ACK/NACK feedback associated with a second subset of the multiple PDSCH communications. The UE may transmit the second PUCCH to the network unit via the SCell 412. The SCell 412 may be different from the PCell 410. In some aspects, the configuration received from the network unit may include an identifier of the SCell 412. The SCell 412 may be a secondary cell (SCell) for a secondary cell group (SCG). In some aspects, the SCell 412 may operate in LTE mode while the PCell 410 operates in 5G NR mode. Additionally or alternatively, the PCell 410 may operate in LTE mode while the SCell 412 operates in 5G NR mode. In some aspects, the PCell 410 and SCell 412 may be different RUs (e.g., RU 240) of the same network unit (e.g., the same DU 230). In some aspects, the PCell 410 and SCell 412 may be different RUs (e.g., RU 240) of different network units (e.g., different DU 230).

In some aspects, the UE may receive one or more indicators from the network unit identifying the PCell 410 and the SCell 412. In this regard, the UE may receive the indicator(s) on a semi-static basis via a RRC communication, a MAC-CE communication, or other suitable communication. In some aspects, the indicator(s) may indicate a periodic switching of the PCell 410 and the SCell 412. For example, the indicator(s) may indicate which slots of slot i to slot i+7 are configured for downlink 414, switching 416, or uplink 418. The UE may transmit the first PUCCH and the second PUCCH in an uplink 418 slot. Additionally or alternatively, the UE may receive the indicator(s) indicating the PCell 410 and the SCell 412 on a dynamic basis via DCI in the single PDCCH communication.

Figure 5:
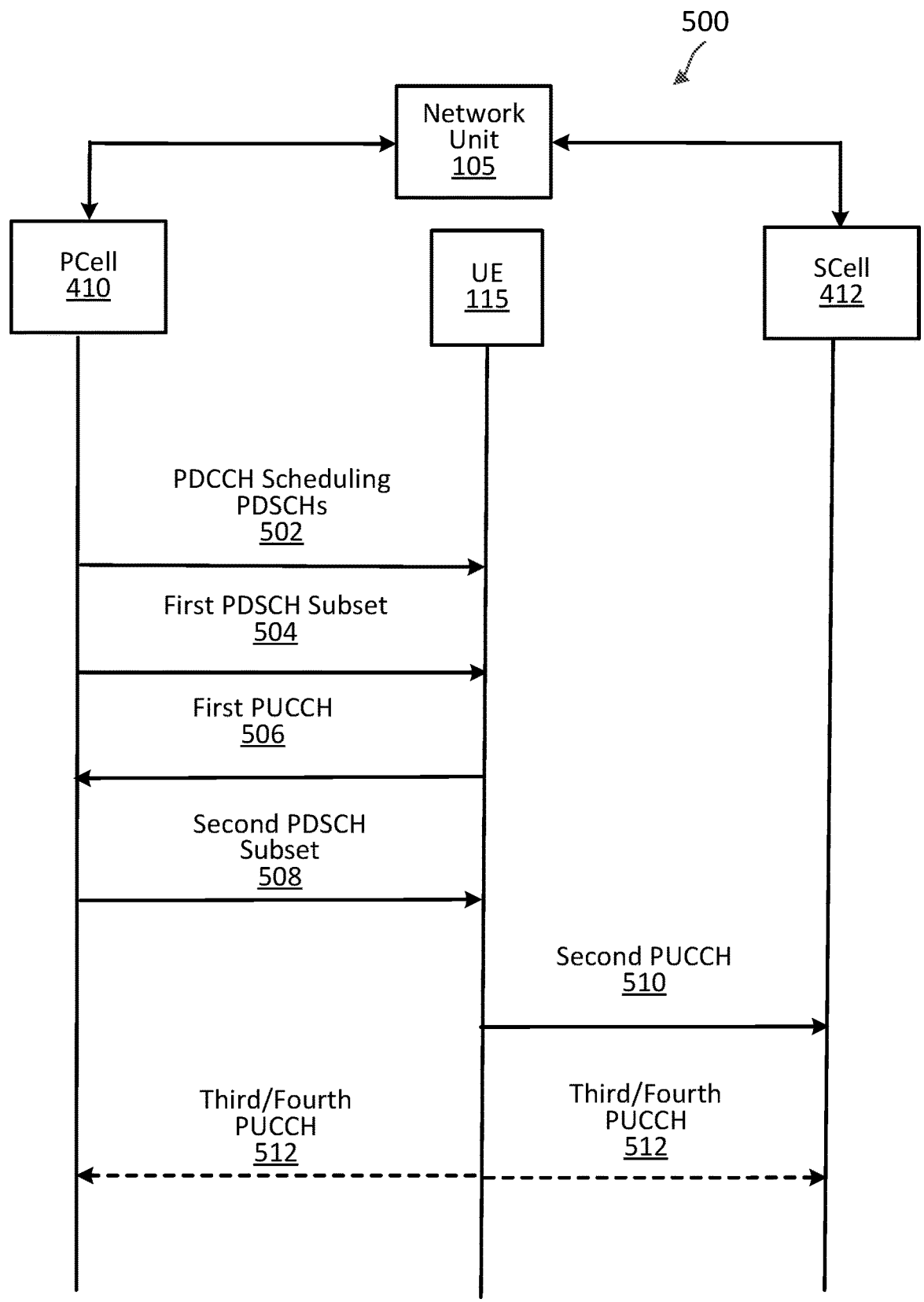
FIG. 5 is a signal flow diagram of a communication method according to some aspects of the present disclosure.

FIG. 5 is a flow diagram of a communication method 500 according to some aspects of the present disclosure. Aspects of the method 500 may be executed by a computing device (e.g., a processor, processing circuit, and/or other suitable component) of a wireless communication device or other suitable means for performing the actions. For example, a wireless communication device, such as the BS 105, the RU 240, the DU 230, the CU 210, and/or the network unit 700, may utilize one or more components, such as the processor 702, the memory 704, the carrier switching module 708, the transceiver 710, the modem 712, and the one or more antennas 716, to execute aspects of method 500. For example, a wireless communication device, such as the UE 115 or the UE 600 may utilize one or more components, such as the processor 602, the memory 604, the carrier switching module 608, the transceiver 610, the modem 612, and the one or more antennas 616, to execute aspects of method 500. The method 500 may employ similar mechanisms as in the networks 100, 200, and/or 300 and the aspects and actions described with respect to FIGS. 3-4. As illustrated, the method 500 includes a number of enumerated actions, but the method 500 may include additional actions before, after, and in between the enumerated actions. In some aspects, one or more of the enumerated actions may be omitted or performed in a different order.

At action 502, a network unit 105 may transmit a configuration to a UE 115 scheduling multiple physical downlink shared channel (PDSCH) communications. In this regard, the network unit 105 may transmit the configuration via a single physical downlink control channel (PDCCH) communication using PCell 410. In some aspects, the single PDCCH communication may include downlink control information (DCI) scheduling the multiple PDSCH communications.

At action 504, a network unit 105 may transmit an indicator indicating a number of PDSCH communications (e.g., 1, 2, 3, 4, or more PDSCH communications) in the first subset of the multiple PDSCH communications. In this regard, the network unit 105 may transmit the indicator of the number of PDSCH communications in the first subset of PDSCH communications using the PCell 410 via at least one of the single PDCCH communication, a radio resource control (RRC) communication, a medium access control control element (MAC-CE) communication, a second PDCCH communication, or other suitable communication. Additionally or alternatively, the network unit 105 may transmit an indicator indicating a number of transport blocks (TBs) (e.g., 1, 2, 3, 4, or more TBs) in the first subset of the multiple PDSCH communications. In this regard, the network unit 105 may transmit the indicator of the number of TBs in the first subset of PDSCH communications via at least one of the single PDCCH communication, a radio resource control (RRC) communication, a medium access control control element (MAC-CE) communication, a second PDCCH communication, or other suitable communication.

At action 504, the UE may receive the first subset of PDSCH communications from the network unit 105.

At action 506, the UE may transmit a first PUCCH communication to the network unit 105. The first PUCCH communication may include acknowledgement/negative acknowledgement (ACK/NACK) feedback associated with a first subset of the multiple PDSCH communications. The first PUCCH may indicate for each PDSCH of the first subset of PDCCHs whether each PDSCH was correctly received by the UE (e.g., ACK) or not correctly received (e.g., NACK). The UE 115 may transmit the first PUCCH to the network unit 105 via the PCell 410.

At action 508, the UE may receive the second subset of PDSCH communications from the network unit 105.

At action 510, the UE may transmit a second PUCCH communication to the network unit 105. The second PUCCH communication may include acknowledgement/negative acknowledgement (ACK/NACK) feedback associated with the second subset of the multiple PDSCH communications. The second PUCCH may indicate for each PDSCH of the second subset of PDCCHs whether each PDSCH was correctly received by the UE (e.g., ACK) or not correctly received (e.g., NACK). The UE 115 may transmit the second PUCCH communication to the network unit 105 via the SCell 412. In some aspects, the UE 115 may transmit the first PUCCH communication before transmitting the second PUCCH communication. In this regard, the UE 115 may transmit the first PUCCH communication at action 506 before transmitting the second PUCCH communication at action 510 based on a latency budget associated with the first subset of PDSCH communications. For example, the first subset of PDSCH communications may have a latency budget based on the associated application (e.g., extended reality application, ultra-reliable low-latency communication (URLLC) application, vehicle-to-everything (V2X) application, etc.). Transmitting the first PUCCH communication before the second PUCCH communication may allow for faster retransmissions of PDSCH communications that were not correctly received by the UE.

At action 512, the UE may optionally transmit a third PUCCH communication to the network unit 105 comprising the ACK/NACK feedback associated with the first subset of the multiple PDSCH communications. The UE 115 may transmit the third PUCCH communication via the PCell 410 and/or the SCell 412. Retransmitting the ACK/NACK feedback associated with the first subset of the multiple PDSCH communications in a third PUCCH communication may increase the probability of correct reception of the ACK/NACK feedback by the network unit. Additionally or alternatively, the UE 115 may optionally transmit a fourth PUCCH communication to the network unit comprising the ACK/NACK feedback associated with the second subset of the multiple PDSCH communications. The UE 115 may transmit the fourth PUCCH communication via the PCell 410 and/or the SCell 412. Retransmitting the ACK/NACK feedback associated with the second subset of PDSCH communications in a fourth PUCCH communication may increase the probability of correct reception of the ACK/NACK feedback by the network unit.

Figure 6:
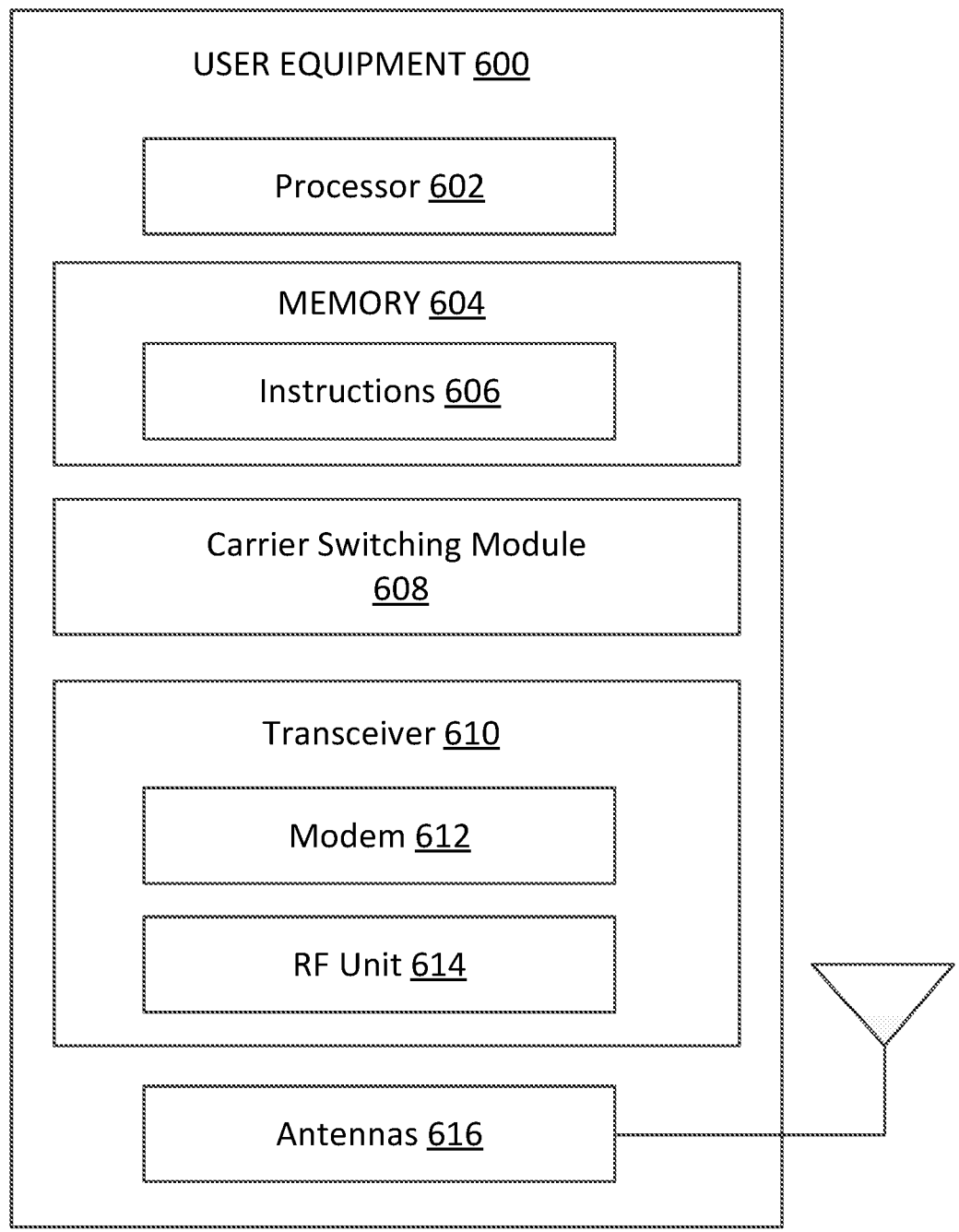
FIG. 6 is a block diagram of an exemplary user equipment (UE) according to some aspects of the present disclosure.

FIG. 6 is a block diagram of an exemplary UE 600 according to some aspects of the present disclosure. The UE 600 may be the UE 115 in the network 100, or 200 as discussed above. As shown, the UE 600 may include a processor 602, a memory 604, a carrier switching module 608, a transceiver 610 including a modem subsystem 612 and a radio frequency (RF) unit 614, and one or more antennas 616. These elements may be coupled with each other and in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 604 includes a non-transitory computer-readable medium. The memory 604 may store instructions 606. The instructions 606 may include instructions that, when executed by the processor 602, cause the processor 602 to perform the operations described herein with reference to the UEs 115 in connection with aspects of the present disclosure, for example, aspects of FIGS. 3-6. Instructions 606 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The carrier switching module 608 may be implemented via hardware, software, or combinations thereof. For example, the carrier switching module 608 may be implemented as a processor, circuit, and/or instructions 606 stored in the memory 604 and executed by the processor 602. In some aspects, the carrier switching module 608 may implement the aspects of FIGS. 3-5. For example, the carrier switching module 608 may receive, from a network unit (e.g., network unit 700, the BS 105, the CU 210, the DU 230, or the RU 240), via a single physical downlink control channel (PDCCH) communication, a configuration scheduling multiple physical downlink shared channel (PDSCH) communications. The carrier switching module 608 may transmit, to the network unit via a first cell, a first physical uplink control channel (PUCCH) communication comprising acknowledgement/negative acknowledgement (ACK/NACK) feedback associated with a first subset of the multiple PDSCH communications. The carrier switching module 608 may transmit, to the network unit via a second cell, a second PUCCH communication comprising ACK/NACK feedback associated with a second subset of the multiple PDSCH communications. The second cell may be different from the first cell.

As shown, the transceiver 610 may include the modem subsystem 612 and the RF unit 614. The transceiver 610 may be configured to communicate bi-directionally with other devices, such as the BSs 105 and/or the UEs 115. The modem subsystem 612 may be configured to modulate and/or encode the data from the memory 604 and the according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together to enable the UE 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The antennas 616 may include multiple antennas of similar or different designs in order to sustain multiple transmission links. The RF unit 614 may configure the antennas 616.

In some instances, the UE 600 may include multiple transceivers 610 implementing different RATs (e.g., NR and LTE). In some instances, the UE 600 may include a single transceiver 610 implementing multiple RATs (e.g., NR and LTE). In some instances, the transceiver 610 may include various components, where different combinations of components may implement RATs.

Figure 7:
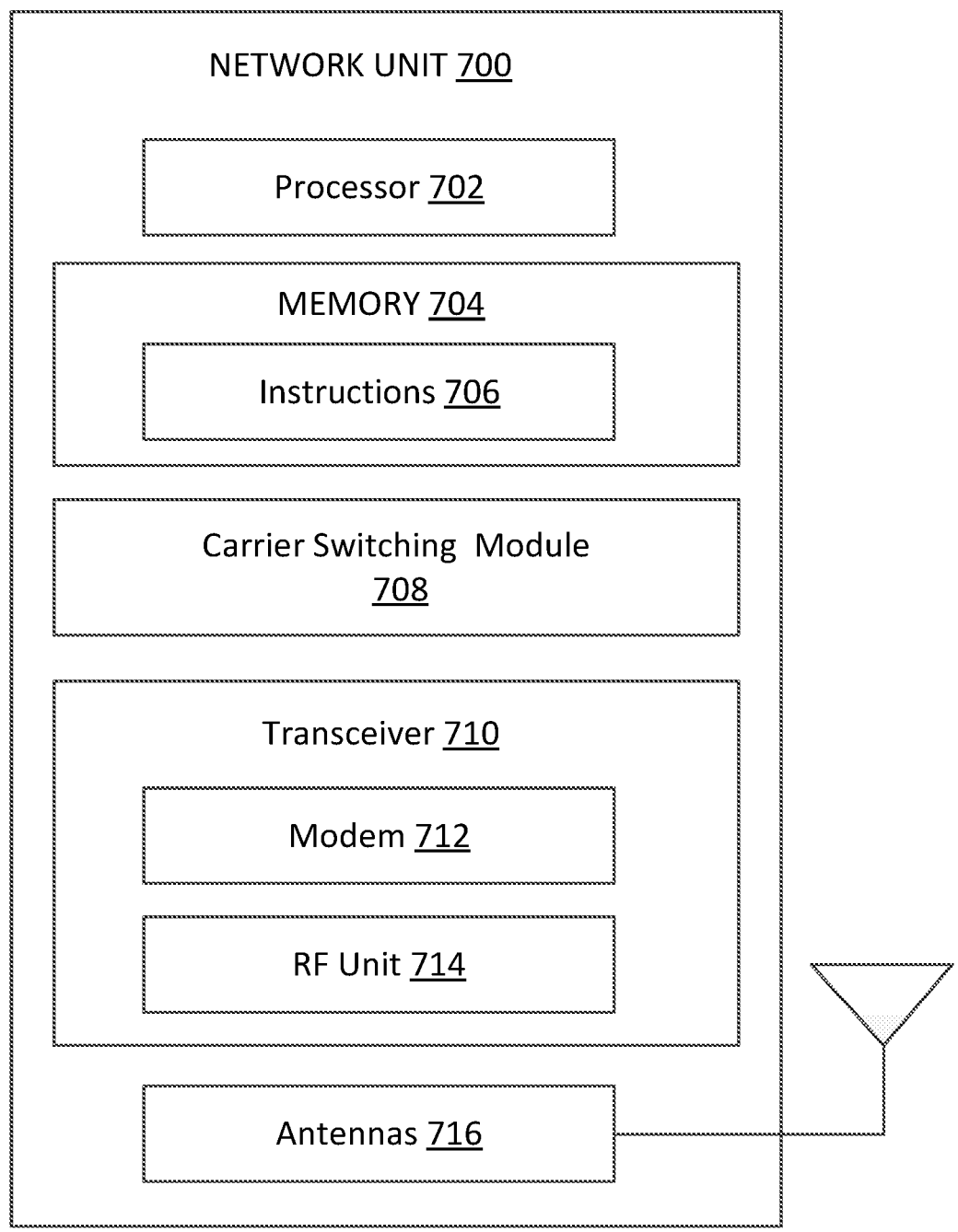
FIG. 7 is a block diagram of an exemplary network unit according to some aspects of the present disclosure.

FIG. 7 is a block diagram of an exemplary network unit 700 according to some aspects of the present disclosure. The network unit 700 may be the BS 105, the CU 210, the DU 230, or the RU 240, as discussed above. As shown, the network unit 700 may include a processor 702, a memory 704, a carrier switching module 708, a transceiver 710 including a modem subsystem 712 and a RF unit 714, and one or more antennas 716. These elements may be coupled with each other and in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 3-5. Instructions 706 may also be referred to as code, which may be interpreted broadly to include any type of computer-readable statement(s).

The carrier switching module 708 may be implemented via hardware, software, or combinations thereof. For example, the carrier switching module 708 may be implemented as a processor, circuit, and/or instructions 706 stored in the memory 704 and executed by the processor 702.

In some aspects, the carrier switching module 708 may implement the aspects of FIGS. 3-5. For example, the carrier switching module 708 may transmit, to a UE (e.g., the UE 115 or the UE 600) via a single physical downlink control channel (PDCCH) communication, a configuration scheduling multiple physical downlink shared channel (PDSCH) communications. The carrier switching module 708 may receive, from the UE via a first cell, a first physical uplink control channel (PUCCH) communication comprising acknowledgement/negative acknowledgement (ACK/NACK) feedback associated with a first subset of the multiple PDSCH communications. The carrier switching module 708 may receive, from the UE via a second cell, a second PUCCH communication comprising ACK/NACK feedback associated with a second subset of the multiple PDSCH communications. The second cell may be different from the first cell.

Additionally or alternatively, the carrier switching module 708 may be implemented in any combination of hardware and software, and may, in some implementations, involve, for example, processor 702, memory 704, instructions 706, transceiver 710, and/or modem 712.

As shown, the transceiver 710 may include the modem subsystem 712 and the RF unit 714. The transceiver 710 may be configured to communicate bi-directionally with other devices, such as the UEs 115 and/or UE 600. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or UE 600. The RF unit 714 may be further configured to perform analog beamforming in conjunction with the digital beamforming. Although shown as integrated together in transceiver 710, the modem subsystem 712 and/or the RF unit 714 may be separate devices that are coupled together at the network unit 700 to enable the network unit 700 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, a configuration indicating a plurality of sub-slots within a slot according to aspects of the present disclosure. The antennas 716 may further receive data messages transmitted from other devices and provide the received data messages for processing and/or demodulation at the transceiver 710. The antennas 716 may include multiple antennas of similar or different designs in order to sustain multiple transmission links.

In some instances, the network unit 700 may include multiple transceivers 710 implementing different RATs (e.g., NR and LTE). In some instances, the network unit 700 may include a single transceiver 710 implementing multiple RATs (e.g., NR and LTE). In some instances, the transceiver 710 may include various components, where different combinations of components may implement RATs.

Figure 8:
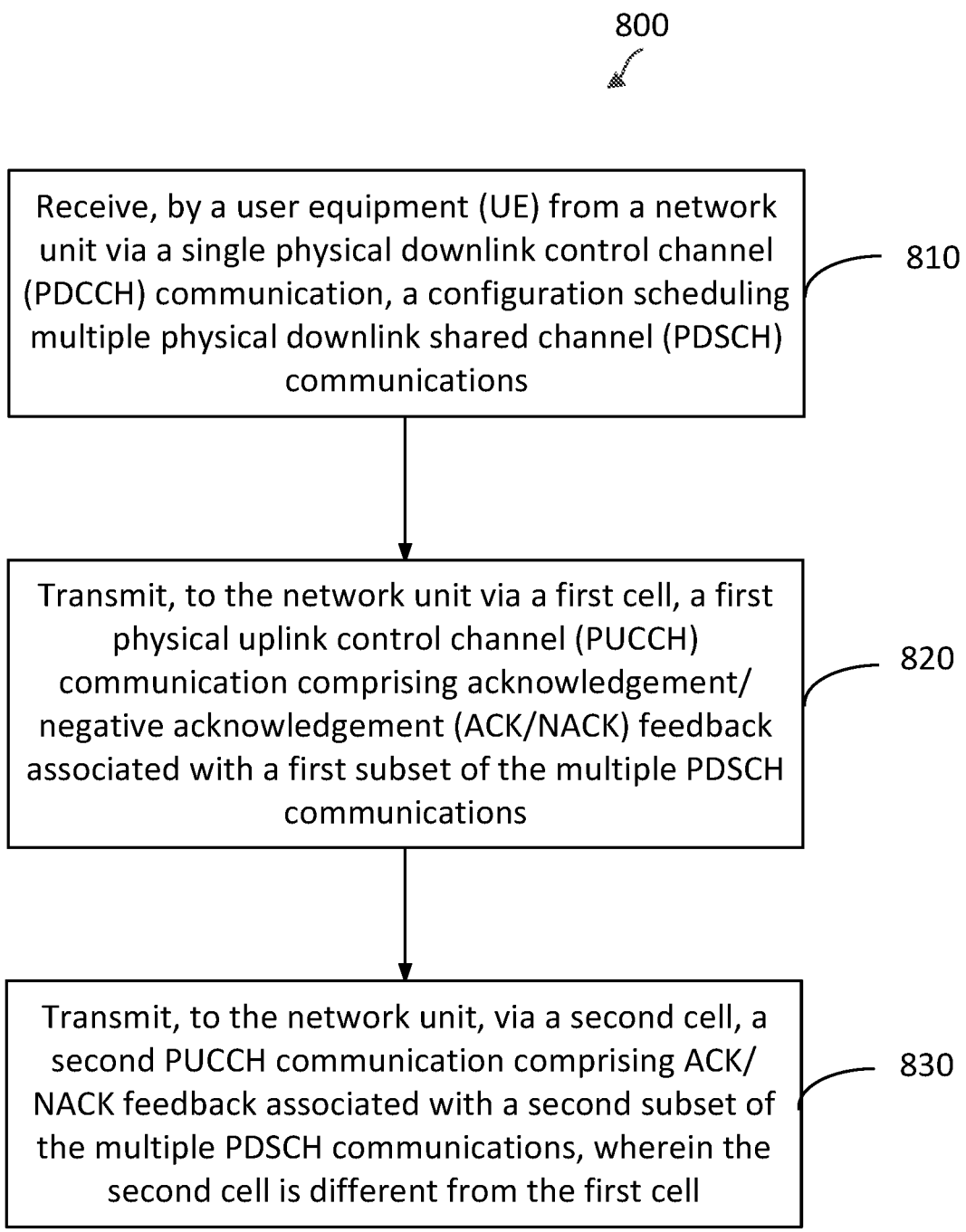
FIG. 8 is a flow diagram of a communication method according to some aspects of the present disclosure.

FIG. 8 is a flow diagram of a communication method 800 according to some aspects of the present disclosure. Aspects of the method 800 can be executed by a computing device (e.g., a processor, processing circuit, and/or other suitable component) of a wireless communication device or other suitable means for performing the actions. For example, a wireless communication device, such as the UE 115 or the UE 600, may utilize one or more components, such as the processor 602, the memory 604, the carrier switching module 608, the transceiver 610, the modem 612, and the one or more antennas 616, to execute aspects of method 800. The method 800 may employ similar mechanisms as in the networks 100 and 200 and the aspects and actions described with respect to FIGS. 3-5. As illustrated, the method 800 includes a number of enumerated actions, but the method 800 may include additional actions before, after, and in between the enumerated actions. In some aspects, one or more of the enumerated actions may be omitted or performed in a different order.

At action 810, the method 800 includes a UE (e.g., the UE 115 or the UE 600) receiving a configuration from a network unit (e.g., the network unit 700, the BS 105, the RU 240, the DU 230, and/or the CU 210) scheduling multiple physical downlink shared channel (PDSCH) communications. In this regard, the UE may receive the configuration via a single physical downlink control channel (PDCCH) communication. In some aspects, the single PDCCH communication may include downlink control information (DCI) scheduling the multiple PDSCH communications.

At action 820, the method 800 includes the UE transmitting a first physical uplink control channel (PUCCH) communication to the network unit. The first PUCCH communication may include acknowledgement/negative acknowledgement (ACK/NACK) feedback associated with a first subset of the multiple PDSCH communications. The first PUCCH may indicate for each PDSCH of the first subset of PDCCHs whether each PDSCH was correctly received by the UE (e.g., ACK) or not correctly received (e.g., NACK). The UE may transmit the first PUCCH to the network unit via a first cell. In some aspects, the configuration received from the network unit at action 810 may include an identifier of the first cell. The first cell may be a primary cell (PCell) for a master cell group (MCG) and/or a primary secondary cell (PSCell) for a secondary cell group (SCG).

In some aspects, the UE may receive an indicator indicating a number of PDSCH communications (e.g., 1, 2, 3, 4, or more PDSCH communications) in the first subset of the multiple PDSCH communications. In this regard, the UE may receive the indicator of the number of PDSCH communications in the first subset of PDSCH communications via at least one of the single PDCCH communication, a radio resource control (RRC) communication, a medium access control control element (MAC-CE) communication, a second PDCCH communication, or other suitable communication.

Additionally or alternatively, the UE may receive an indicator indicating a number of transport blocks (TBs) (e.g., 1, 2, 3, 4, or more TBs) in the first subset of the multiple PDSCH communications. In this regard, the UE may receive the indicator of the number of TBs in the first subset of PDSCH communications via at least one of the single PDCCH communication, a radio resource control (RRC) communication, a medium access control control element (MAC-CE) communication, a second PDCCH communication, or other suitable communication.

In some aspects, the configuration received at action 810 may further indicate at least one of first time resources, first frequency resources, and/or first beam resources associated with the first PUCCH communication. For example, the first time resources may include a slot indicator (e.g., slot index) and/or a symbol indicator (e.g., symbol index) in which the UE transmits the first PUCCH communication. The configuration may further indicate a first time offset from the single PDCCH communication to the first PUCCH communication. During the first time offset, the UE may monitor for the first subset of PDSCH communications and prepare the HARQ ACK/NACK (e.g., type 1 HARQ ACK/NACK and/or type 2 HARQ ACK/NACK) feedback for transmission in the first PUCCH communication. The time offset may be indicated as a number of slots, a number of symbols, a number of milliseconds, or other suitable time period.

The first frequency resources may include subchannel(s), subband(s), component carrier(s), and/or frequency interlace(s) in which the UE transmits the first PUCCH communication. The first beam resources may include antenna beam(s) in which the UE transmits the first PUCCH communication. The antenna beam(s) may be directional beam(s) for transmitting the first PUCCH communication in the direction of the first cell.

In some aspects, the UE may transmit a first index to the network unit indicating the first subset of the multiple PDSCH communications. The UE may transmit the first index to the network unit indicating the first subset of the multiple PDSCH communications via the first PUCCH communication. The index may be a bit pattern indicating which PDSCH communications are being acknowledged or negatively acknowledged by the first PUCCH communication.

At action 830, the method 800 includes the UE transmitting a second PUCCH communication to the network unit. The second PUCCH communication may include ACK/NACK feedback associated with a second subset of the multiple PDSCH communications. The second PUCCH may indicate for each PDSCH of the second subset of PDCCHs whether each PDSCH was correctly received by the UE (e.g., ACK) or not correctly received (e.g., NACK). The UE may transmit the second PUCCH to the network unit via a second cell. The second cell may be different from the first cell. In some aspects, the configuration received from the network unit at action 810 may include an identifier of the second cell. The second cell may be a secondary cell (SCell) for a secondary cell group (SCG). In some aspects, the second cell may operate in LTE mode while the first cell operates in 5G NR mode. Additionally or alternatively, the first cell may operate in LTE mode while the second cell operates in 5G NR mode. In some aspects, the first and second cells may be different RUs (e.g., RU 240) of the same network unit (e.g., the same DU 230). In some aspects, the first and second cells may be different RUs (e.g., RU 240) of different network units (e.g., different DU 230).

In some aspects, the UE may receive an indicator indicating a number of PDSCH communications (e.g., 1, 2, 3, 4, or more PDSCH communications) in the second subset of the multiple PDSCH communications. In this regard, the UE may receive the indicator of the number of PDSCH communications in the second subset of PDSCH communications via at least one of the single PDCCH communication, a radio resource control (RRC) communication, a medium access control control element (MAC-CE) communication, a second PDCCH communication, or other suitable communication.

Additionally or alternatively, the UE may receive an indicator indicating a number of transport blocks (TBs) (e.g., 1, 2, 3, 4, or more TBs) in the second subset of the multiple PDSCH communications. In this regard, the UE may receive the indicator of the number of TBs in the second subset of PDSCH communications via at least one of the single PDCCH communication, a radio resource control (RRC) communication, a medium access control control element (MAC-CE) communication, a second PDCCH communication, or other suitable communication.

In some aspects, the configuration received at action 810 may further indicate at least one of second time resources, second frequency resources, or second beam resources associated with the second PUCCH communication. For example, the second time resources may include a slot indicator (e.g., slot index) and/or a symbol indicator (e.g., symbol index) in which the UE transmits the second PUCCH communication. The configuration may further indicate a second time offset from the single PDCCH communication to the second PUCCH communication. During the second time offset the UE may monitor for the second subset of PDSCH communications and prepare the HARQ ACK/NACK (e.g., type 1 HARQ ACK/NACK and/or type 2 HARQ ACK/NACK) feedback for transmission in the second PUCCH communication. The time offset may be indicated as a number of slots, a number of symbols, a number of milliseconds, or other suitable time period.

The second frequency resources may include subchannel(s), subband(s), component carrier(s), and/or frequency interlaces in which the UE transmits the second PUCCH communication. The second beam resources may include antenna beam(s) in which the UE transmits the second PUCCH communication. The antenna beam(s) may be directional beam(s) for transmitting the second PUCCH communication in the direction of the second cell.

In some aspects, the UE may transmit a second index to the network unit indicating the second subset of the multiple PDSCH communications. The UE may transmit the second index to the network unit indicating the ACK/NACK for the second subset of the multiple PDSCH communications. The second index may be a bit pattern indicating which PDSCH communications are being acknowledged or negatively acknowledged by the second PUCCH communication. The first PUCCH communication may use a codebook different from the codebook used for the second PUCCH communication.

In some aspects, the UE may transmit the first PUCCH communication before transmitting the second PUCCH communication. In this regard, the UE may transmit the first PUCCH communication before transmitting the second PUCCH communication based on a latency budget associated with the first subset of PDSCH communications. For example, the first subset of PDSCH communications may have a latency budget based on the associated application (e.g., extended reality application, ultra-reliable low-latency communication (URLLC) application, vehicle-to-everything (V2X) application, etc.). Transmitting the first PUCCH communication before the second PUCCH communication may allow for faster retransmissions of PDSCH communications that were not correctly received by the UE.

In some aspects, the UE may receive the first subset and second subset of the multiple PDSCH communications from the network unit. In this regard, the UE may receive the first subset and second subset of the multiple PDSCH communications via the first cell and/or the second cell. The UE may transmit the first PUCCH communication after receiving the first subset of PDSCH communications and before receiving the second subset of PDSCH communications. The UE may transmit the second PUCCH communication after receiving the second subset of PDSCH communications. Although the present disclosure describes two subsets of PDSCH communications being acknowledged in two PUCCH communications, the present disclosure is not so limited and any number of PDSCH communications may be acknowledged by any number of PUCCH communications via any number of cells.

In some aspects, the UE may transmit a third PUCCH communication to the network unit comprising the ACK/NACK feedback associated with the first subset of the multiple PDSCH communications. The UE may transmit the third PUCCH communication via the first cell and/or the second cell. Retransmitting the ACK/NACK feedback associated with the first subset of the multiple PDSCH communications in a third PUCCH communication may increase the probability of correct reception of the ACK/NACK feedback by the network unit. Additionally or alternatively, the UE may transmit a fourth PUCCH communication to the network unit comprising the ACK/NACK feedback associated with the second subset of the multiple PDSCH communications. The UE may transmit the fourth PUCCH communication via the first cell and/or the second cell. Retransmitting the ACK/NACK feedback associated with the second subset of the multiple PDSCH communications in a fourth PUCCH communication may increase the probability of correct reception of the ACK/NACK feedback by the network unit.

In some aspects, the UE may transmit the second PUCCH communication to the network unit via the second cell further comprising the ACK/NACK feedback associated with the first subset of the multiple PDSCH communications. In this case, the first PUCCH communication may include ACK/NACK feedback associated with the first subset of the multiple PDSCH communications and the second PUCCH communication may include ACK/NACK feedback associated with the first subset and second subset of the multiple PDSCH communications.

In some aspects, the UE may receive one or more indicators from the network unit identifying the first cell and the second cell. In this regard, the UE may receive the indicator(s) on a semi-static basis via a RRC communication, a MAC-CE communication, or other suitable communication. In some aspects, the indicator(s) may indicate a periodic switching of the first cell and the second cell. Additionally or alternatively, the UE may receive the indicator(s) indicating the first cell and the second cell on a dynamic basis via DCI in the single PDCCH communication.

Figure 9:
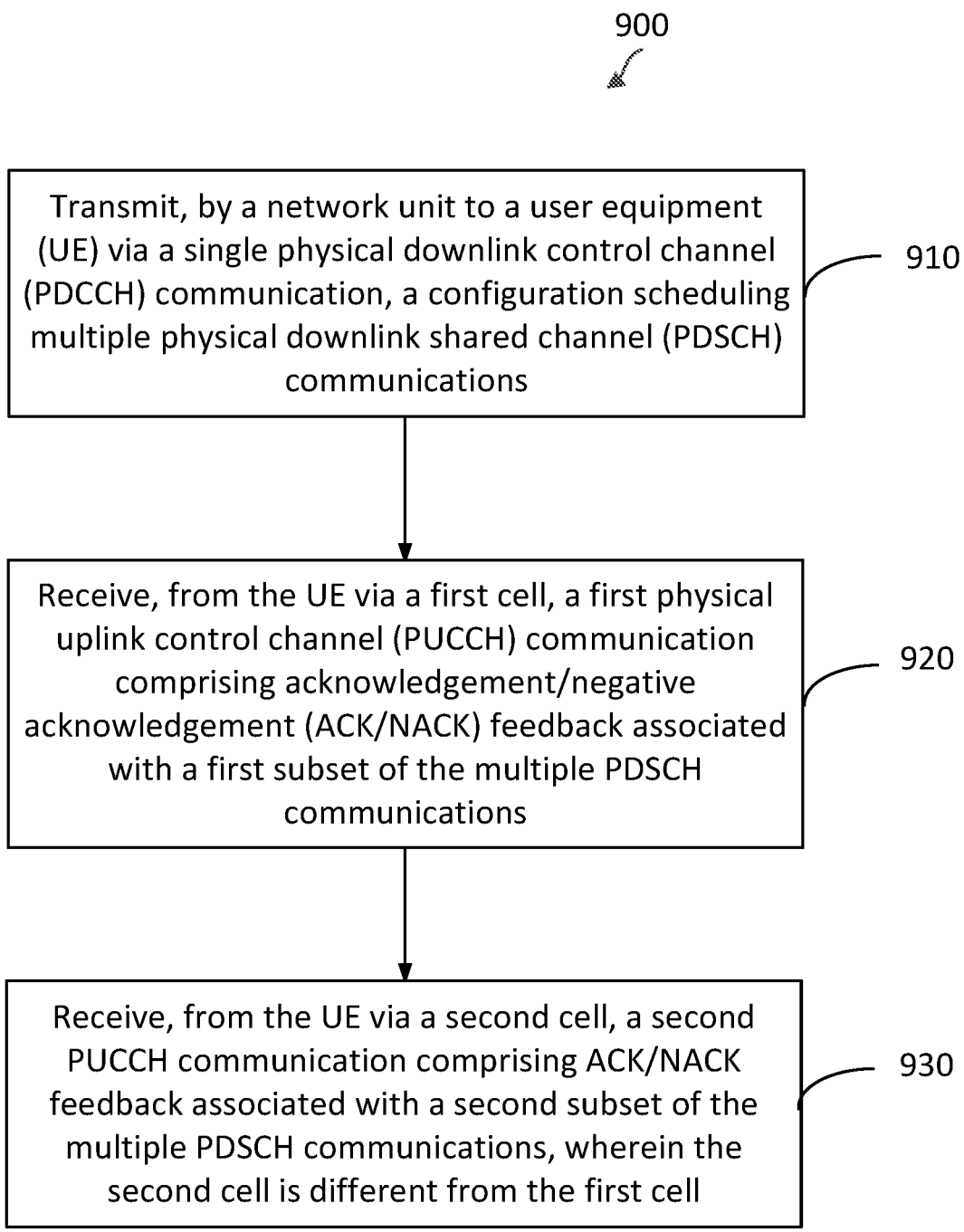
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the actions. For example, a wireless communication device, such as the network unit 700, the BS 105, the RU 240, the DU 230, and/or the CU 210, may utilize one or more components, such as the processor 702, the memory 704, the carrier switching module 708, the transceiver 710, the modem 712, and the one or more antennas 716, to execute aspects of method 900. The method 900 may employ similar mechanisms as in the networks 100 and 200 and the aspects and actions described with respect to FIGS. 3-5. As illustrated, the method 900 includes a number of enumerated actions, but the method 900 may include additional actions before, after, and in between the enumerated actions. In some aspects, one or more of the enumerated actions may be omitted or performed in a different order.

At action 910, the method 900 includes a network unit (e.g., the network unit 700, the BS 105, the RU 240, the DU 230, and/or the CU 210) transmitting a configuration to a UE (e.g., the UE 115 or the UE 600) scheduling multiple physical downlink shared channel (PDSCH) communications. In this regard, the network unit may transmit the configuration via a single physical downlink control channel (PDCCH) communication. In some aspects, the single PDCCH communication may include downlink control information (DCI) scheduling the multiple PDSCH communications.

At action 920, the method 900 includes the network unit receiving a first physical uplink control channel (PUCCH) communication from the UE. The first PUCCH communication may include acknowledgement/negative acknowledgement (ACK/NACK) feedback associated with a first subset of the multiple PDSCH communications. The first PUCCH may indicate for each PDSCH of the first subset of PDCCHs whether each PDSCH was correctly received by the UE (e.g., ACK) or not correctly received (e.g., NACK). The network unit may receive the first PUCCH from the UE via a first cell. In some aspects, the configuration transmitted to the UE at action 810 may include an identifier of the first cell. The first cell may be a primary cell (PCell) for a master cell group (MCG) and/or a primary secondary cell (PSCell) for a secondary cell group (SCG).

In some aspects, the network unit may transmit an indicator indicating a number of PDSCH communications (e.g., 1, 2, 3, 4, or more PDSCH communications) in the first subset of the multiple PDSCH communications. In this regard, the network unit may transmit the indicator of the number of PDSCH communications in the first subset of PDSCH communications via at least one of the single PDCCH communication, a radio resource control (RRC) communication, a medium access control control element (MAC-CE) communication, a second PDCCH communication, or other suitable communication.

Additionally or alternatively, the network unit may transmit an indicator indicating a number of transport blocks (TBs) (e.g., 1, 2, 3, 4, or more TBs) in the first subset of the multiple PDSCH communications. In this regard, the network unit may transmit the indicator of the number of TBs in the first subset of PDSCH communications via at least one of the single PDCCH communication, a radio resource control (RRC) communication, a medium access control control element (MAC-CE) communication, a second PDCCH communication, or other suitable communication.

In some aspects, the configuration transmitted at action 910 may further indicate at least one of first time resources, first frequency resources, and/or first beam resources associated with the first PUCCH communication. For example, the first time resources may include a slot indicator (e.g., slot index) and/or a symbol indicator (e.g., symbol index) in which the network unit receives the first PUCCH communication. The configuration may further indicate a first time offset from the single PDCCH communication to the first PUCCH communication. During the first time offset, the UE may monitor for the first subset of PDSCH communications and prepare the HARQ ACK/NACK (e.g., type 1 HARQ ACK/NACK and/or type 2 HARQ ACK/NACK) feedback for transmission in the first PUCCH communication. The time offset may be indicated as a number of slots, a number of symbols, a number of milliseconds, or other suitable time period.

The first frequency resources may include subchannel(s), subband(s), component carrier(s), and/or frequency interlace(s) in which the network unit receives the first PUCCH communication. The first beam resources may include antenna beam(s) in which the UE transmits the first PUCCH communication. The antenna beam(s) may be directional beam(s) for transmitting the first PUCCH communication in the direction of the first cell.

In some aspects, the network unit may receive a first index from the UE indicating the first subset of the multiple PDSCH communications. The network unit may receive the first index from the UE indicating the first subset of the multiple PDSCH communications via the first PUCCH communication. The index may be a bit pattern indicating which PDSCH communications are being acknowledged or negatively acknowledged by the first PUCCH communication.

At action 930, the method 900 includes the network unit receiving a second PUCCH communication from the UE. The second PUCCH communication may include ACK/NACK feedback associated with a second subset of the multiple PDSCH communications. The second PUCCH may indicate for each PDSCH of the second subset of PDCCHs whether each PDSCH was correctly received by the UE (e.g., ACK) or not correctly received (e.g., NACK). The network unit may receive the second PUCCH from the UE via a second cell. The second cell may be different from the first cell. In some aspects, the configuration transmitted by the network unit at action 910 may include an identifier of the second cell. The second cell may be a secondary cell (SCell) for a secondary cell group (SCG). In some aspects, the second cell may operate in LTE mode while the first cell operates in 5G NR mode. Additionally or alternatively, the first cell may operate in LTE mode while the second cell operates in 5G NR mode. In some aspects, the first and second cells may be different RUs (e.g., RU 240) of the same network unit (e.g., the same DU 230). In some aspects, the first and second cells may be different RUs (e.g., RU 240) of different network units (e.g., different DU 230s).

In some aspects, the network unit may transmit an indicator indicating a number of PDSCH communications (e.g., 1, 2, 3, 4, or more PDSCH communications) in the second subset of the multiple PDSCH communications. In this regard, the network unit may transmit the indicator of the number of PDSCH communications in the second subset of PDSCH communications via at least one of the single PDCCH communication, a radio resource control (RRC) communication, a medium access control control element (MAC-CE) communication, a second PDCCH communication, or other suitable communication.

Additionally or alternatively, the network unit may transmit an indicator indicating a number of transport blocks (TBs) (e.g., 1, 2, 3, 4, or more TBs) in the second subset of the multiple PDSCH communications. In this regard, the network unit may transmit the indicator of the number of TBs in the second subset of PDSCH communications via at least one of the single PDCCH communication, a radio resource control (RRC) communication, a medium access control control element (MAC-CE) communication, a second PDCCH communication, or other suitable communication.

In some aspects, the configuration transmitted by the network unit at action 910 may further indicate at least one of second time resources, second frequency resources, or second beam resources associated with the second PUCCH communication. For example, the second time resources may include a slot indicator (e.g., slot index) and/or a symbol indicator (e.g., symbol index) in which the network unit receives the second PUCCH communication. The configuration may further indicate a second time offset from the single PDCCH communication to the second PUCCH communication. During the second time offset the UE may monitor for the second subset of PDSCH communications and prepare the HARQ ACK/NACK (e.g., type 1 HARQ ACK/NACK and/or type 2 HARQ ACK/NACK) feedback for transmission in the second PUCCH communication. The time offset may be indicated as a number of slots, a number of symbols, a number of milliseconds, or other suitable time period.

The second frequency resources may include subchannel(s), subband(s), component carrier(s), and/or frequency interlaces in which the network unit may receive the second PUCCH communication. The second beam resources may include antenna beam(s) in which the UE transmits the second PUCCH communication. The antenna beam(s) may be directional beam(s) for transmitting the second PUCCH communication in the direction of the second cell.

In some aspects, the network unit may receive a second index from the UE indicating the second subset of the multiple PDSCH communications. The network unit may receive the second index from the UE indicating the ACK/NACK for the second subset of the multiple PDSCH communications. The second index may be a bit pattern indicating which PDSCH communications are being acknowledged or negatively acknowledged by the second PUCCH communication. The first PUCCH communication may use a codebook different from the codebook used for the second PUCCH communication.

In some aspects, the network unit may receive the first PUCCH communication before receiving the second PUCCH communication. In this regard, the network unit may receive the first PUCCH communication before receiving the second PUCCH communication based on a latency budget associated with the first subset of PDSCH communications. For example, the first subset of PDSCH communications may have a latency budget based on the associated application (e.g., extended reality application, ultra-reliable low-latency communication (URLLC) application, vehicle-to-everything (V2X) application, etc.). The network unit receiving the first PUCCH communication before the second PUCCH communication may allow for faster retransmissions of PDSCH communications by the network unit that were not correctly received by the UE.

In some aspects, the network unit may transmit the first subset and second subset of the multiple PDSCH communications to the UE. In this regard, the network unit may transmit the first subset and second subset of the multiple PDSCH communications via the first cell and/or the second cell. The network unit may receive the first PUCCH communication after transmitting the first subset of PDSCH communications and before transmitting the second subset of PDSCH communications. The network unit may receive the second PUCCH communication after transmitting the second subset of PDSCH communications. Although the present disclosure describes two subsets of PDSCH communications being acknowledged in two PUCCH communications, the present disclosure is not so limited and any number of PDSCH communications may be acknowledged by any number of PUCCH communications via any number of cells.

In some aspects, the network unit may receive a third PUCCH communication from the UE comprising the ACK/NACK feedback associated with the first subset of the multiple PDSCH communications. The network unit may receive the third PUCCH communication via the first cell and/or the second cell. The UE retransmitting the ACK/NACK feedback associated with the first subset of the multiple PDSCH communications in a third PUCCH communication may increase the probability of correct reception of the ACK/NACK feedback by the network unit. Additionally or alternatively, the network unit may receive a fourth PUCCH communication from the UE comprising the ACK/NACK feedback associated with the second subset of the multiple PDSCH communications. The network unit may receive the fourth PUCCH communication via the first cell and/or the second cell. The UE retransmitting the ACK/NACK feedback associated with the second subset of the multiple PDSCH communications in a fourth PUCCH communication may increase the probability of correct reception of the ACK/NACK feedback by the network unit.

In some aspects, the network unit may receive the second PUCCH communication from the UE via the second cell further comprising the ACK/NACK feedback associated with the first subset of the multiple PDSCH communications. In this case, the first PUCCH communication may include ACK/NACK feedback associated with the first subset of the multiple PDSCH communications and the second PUCCH communication may include ACK/NACK feedback associated with the first subset and second subset of the multiple PDSCH communications.

In some aspects, the network unit may transmit one or more indicators to the UE identifying the first cell and the second cell. In this regard, the network unit may transmit the indicator(s) on a semi-static basis via a RRC communication, a MAC-CE communication, or other suitable communication. In some aspects, the indicator(s) may indicate a periodic switching of the first cell and the second cell. Additionally or alternatively, the network unit may transmit the indicator(s) indicating the first cell and the second cell on a dynamic basis via DCI in the single PDCCH communication.

Further aspects of the present disclosure include the following:

Aspect 1 includes a method of wireless communication performed by a user equipment (UE), the method receiving, from a network unit via a single physical downlink control channel (PDCCH) communication, a configuration scheduling multiple physical downlink shared channel (PDSCH) communications; transmitting, to the network unit via a first cell, a first physical uplink control channel (PUCCH) communication comprising acknowledgement/negative acknowledgement (ACK/NACK) feedback associated with a first subset of the multiple PDSCH communications; and transmitting, to the network unit, via a second cell, a second PUCCH communication comprising ACK/NACK feedback associated with a second subset of the multiple PDSCH communications, wherein the second cell is different from the first cell.

Aspect 2 includes the method of aspect 1, wherein the receiving the configuration comprises receiving the configuration in downlink control information (DCI) via the single PDCCH communication.

Aspect 3 includes the method of any of aspects 1-2, wherein the transmitting the first PUCCH communication comprises transmitting the first PUCCH communication before transmitting the second PUCCH communication.

Aspect 4 includes the method of any of aspects 1-3, wherein the transmitting the first PUCCH communication before transmitting the second PUCCH communication is based on a latency budget associated with the first subset of the multiple PDSCH communications.

Aspect 5 includes the method of any of aspects 1-4, wherein the configuration comprises a bit field indicating the first cell comprises a primary cell (PCell) or a primary secondary cell (PSCell) and the second cell comprises a secondary cell (SCell).

Aspect 6 includes the method of any of aspects 1-5, further comprising receiving, from the network unit, the first subset of the multiple PDSCH communications; and receiving, from the network unit, the second subset of the multiple PDSCH communications, wherein the transmitting the first PUCCH communication comprises transmitting the first PUCCH communication after the receiving the first subset of PDSCH communications and before the receiving the second subset of PDSCH communications; and the transmitting the second PUCCH communication comprises transmitting the second PUCCH communication after the receiving the second subset of PDSCH communications.

Aspect 7 includes the method of any of aspects 1-6, further comprising receiving, from the network unit, an indicator indicating a number of PDSCH communications in the first subset of the multiple PDSCH communications.

Aspect 8 includes the method of any of aspects 1-7, wherein the receiving the indicator comprises receiving the indicator via at least one of a radio resource control (RRC) communication, a medium access control control element (MAC-CE) communication, or the single PDCCH communication.

Aspect 9 includes the method of any of aspects 1-8, further comprising receiving, from the network unit, an indicator indicating a number of transport blocks (TBs) in the first subset of the multiple PDSCH communications.

Aspect 10 includes the method of any of aspects 1-9, wherein the receiving the indicator comprises receiving the indicator via at least one of a radio resource control (RRC) communication, a medium access control control element (MAC-CE) communication, or the single PDCCH communication.

Aspect 11 includes the method of any of aspects 1-10, wherein the configuration indicates at least one of first time resources, first frequency resources, or first beam resources associated with the first PUCCH communication; and at least one of second time resources, second frequency resources, or second beam resources associated with the second PUCCH communication.

Aspect 12 includes the method of any of aspects 1-11, wherein the configuration indicates at least one of a first time offset from the single PDCCH communication to the first PUCCH communication; or a second time offset from the single PDCCH communication to the second PUCCH communication.

Aspect 13 includes the method of any of aspects 1-12, wherein the configuration indicates at least one of a first time offset from the single PDCCH communication to the first PUCCH communication; or a second time offset from the first PUCCH communication to the second PUCCH communication.

Aspect 14 includes the method of any of aspects 1-13, further comprising receiving, from the network unit on a semi-static basis, one or more indicators identifying the first cell and the second cell.

Aspect 15 includes the method of any of aspects 1-14, further comprising receiving, from the network unit in downlink control information (DCI) via the single PDCCH, an identifier identifying the first cell and identifying the second cell.

Aspect 16 includes the method of any of aspects 1-15, further comprising transmitting, to the network unit via the first PUCCH communication, a first index indicating the first subset of the multiple PDSCH communications; and transmitting, to the network unit via the second PUCCH communication, a second index indicating the second subset of the multiple PDSCH communications.

Aspect 17 includes the method of any of aspects 1-16, further comprising at least one of transmitting, to the network unit via the first cell, a third PUCCH communication comprising the ACK/NACK feedback associated with the first subset of the multiple PDSCH communications; or transmitting, to the network unit via the second cell, a fourth PUCCH communication comprising the ACK/NACK feedback associated with the second subset of the multiple PDSCH communications.

Aspect 18 includes the method of any of aspects 1-17, wherein the transmitting, to the network unit, via the second cell, the second PUCCH communication comprises transmitting the second PUCCH communication further comprising the ACK/NACK feedback associated with the first subset of the multiple PDSCH communications.

Aspect 19 includes method of wireless communication performed by a network unit, the method comprising transmitting, to a user equipment (UE) via a single physical downlink control channel (PDCCH) communication, a configuration scheduling multiple physical downlink shared channel (PDSCH) communications; receiving, from the UE via a first cell, a first physical uplink control channel (PUCCH) communication comprising acknowledgement/ negative acknowledgement (ACK/NACK) feedback associated with a first subset of the multiple PDSCH communications; and receiving, from the UE via a second cell, a second PUCCH communication comprising ACK/NACK feedback associated with a second subset of the multiple PDSCH communications, wherein the second cell is different from the first cell.

Aspect 20 includes the method of aspect 19, wherein the transmitting the configuration comprises transmitting the configuration in downlink control information (DCI) via the single PDCCH communication.

Aspect 21 includes the method of any of aspects 19-20, wherein the receiving the first PUCCH communication comprises receiving the first PUCCH before receiving the second PUCCH.

Aspect 22 includes the method of any of aspects 19-21, wherein the receiving the first PUCCH before receiving the second PUCCH is based on a latency budget associated with the first subset of the multiple PDSCH communications.

Aspect 23 includes the method of any of aspects 19-22, wherein the configuration comprises a bit field indicating the first cell comprises a primary cell (PCell) or a primary secondary cell (PSCell) and the second cell comprises a secondary cell (SCell).

Aspect 24 includes the method of any of aspects 19-23, further comprising transmitting, to the UE, the first subset of the multiple PDSCH communications; and transmitting, to the UE, the second subset of the multiple PDSCH communications, wherein the receiving the first PUCCH communication comprises receiving the first PUCCH after the transmitting the first subset of PDSCH communications and before the transmitting the second subset of PDSCH communications; and the receiving the second PUCCH communication comprises receiving the second PUCCH after the transmitting the second subset of PDSCH communications.

Aspect 25 includes the method of any of aspects 19-24, further comprising transmitting, to the UE, an indicator indicating a number of PDSCH communications in the first subset of the multiple PDSCH communications.

Aspect 26 includes the method of any of aspects 19-25, wherein the transmitting the indicator comprises transmitting the indicator via at least one of a radio resource control (RRC) communication, a medium access control control element (MAC-CE) communication, or the single PDCCH communication.

Aspect 27 includes the method of any of aspects 19-26, further comprising transmitting, to the UE, an indicator indicating a number of transport blocks (TBs) in the first subset of the multiple PDSCH communications.

Aspect 28 includes the method of any of aspects 19-27, wherein the transmitting the indicator comprises transmitting the indicator via at least one of a radio resource control (RRC) communication, a medium access control control element (MAC-CE) communication, or the single PDCCH communication.

Aspect 29 includes the method of any of aspects 19-28, wherein the configuration indicates at least one of first time resources, first frequency resources, or first beam resources associated with the first PUCCH communication; and at least one of second time resources, second frequency resources, or second beam resources associated with the second PUCCH communication.

Aspect 30 includes the method of any of aspects 19-29, wherein the configuration indicates at least one of a first time offset from the single PDCCH communication to the first PUCCH communication; or a second time offset from the single PDCCH communication to the second PUCCH communication.

Aspect 31 includes the method of any of aspects 19-30, wherein the configuration indicates at least one of a first time offset from the single PDCCH communication to the first PUCCH communication; or a second time offset from the first PUCCH communication to the second PUCCH communication.

Aspect 32 includes the method of any of aspects 19-31, further comprising transmitting, to the UE on a semi-static basis, one or more indicators identifying the first cell and the second cell.

Aspect 33 includes the method of any of aspects 19-32, further comprising transmitting, to the UE in downlink control information (DCI) via the single PDCCH, an identifier identifying the first cell and identifying the second cell.

Aspect 34 includes the method of any of aspects 19-33, further comprising receiving, from the UE via the first PUCCH communication, a first index indicating the first subset of the multiple PDSCH communications; and receiving, from the UE via the second PUCCH communication, a second index indicating the second subset of the multiple PDSCH communications.

Aspect 35 includes the method of any of aspects 19-34, further comprising at least one of receiving, from the UE via the first cell, a third PUCCH communication comprising the ACK/NACK feedback associated with the first subset of the multiple PDSCH communications; or receiving, from the UE via the second cell, a fourth PUCCH communication comprising the ACK/NACK feedback associated with the second subset of the multiple PDSCH communications.

Aspect 36 includes the method of any of aspects 19-35, wherein the receiving, from the UE via the second cell, the second PUCCH communication comprises receiving the second PUCCH communication further comprising the ACK/NACK feedback associated with the first subset of the multiple PDSCH communications.

Aspect 37 includes a non-transitory computer-readable medium storing one or more instructions for wireless communication, the one or more instructions comprising one or more instructions that, when executed by one or more processors of a user equipment (UE), cause the UE to perform any one of aspects 1-18.

Aspect 38 includes a non-transitory computer-readable medium storing one or more instructions for wireless communication, the one or more instructions comprising one or more instructions that, when executed by one or more processors of a network unit, cause the network unit to perform any one of aspects 19-36.

Aspect 39 includes a user equipment (UE) comprising one or more means to perform any one or more of aspects 1-18.

Aspect 40 includes a network unit comprising one or more means to perform any one or more of aspects 19-36.

Aspect 41 includes a user equipment (UE) comprising a memory; a transceiver; and at least one processor coupled to the memory and the transceiver, wherein the UE is configured to perform any one or more of aspects 1-18.

Aspect 42 includes a network unit comprising a memory; a transceiver; and at least one processor coupled to the memory and the transceiver, wherein the network unit is configured to perform any one or more of aspects 19-36.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations may be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving, from a network unit via a single physical downlink control channel (PDCCH) communication, a configuration scheduling multiple physical downlink shared channel (PDSCH) communications;
   receiving, from the network unit, a first subset of the multiple PDSCH communications;
   transmitting, to the network unit via a first cell, a first physical uplink control channel (PUCCH) communication comprising acknowledgement/negative acknowledgement (ACK/NACK) feedback associated with the first subset of the multiple PDSCH communications after the receiving the first subset of PDSCH communications;
   receiving, from the network unit, a second subset of the multiple PDSCH communications after transmitting the first PUCCH communication; and
   transmitting, to the network unit, via a second cell, a second PUCCH communication comprising ACK/NACK feedback associated with the second subset of the multiple PDSCH communications, wherein the second cell is different from the first cell.

2. The method of claim 1, wherein the receiving the configuration comprises receiving the configuration in downlink control information (DCI) via the single PDCCH communication.

3. The method of claim 1, wherein the transmitting the first PUCCH communication comprises transmitting the first PUCCH communication before transmitting the second PUCCH communication.

4. The method of claim 1, wherein the configuration comprises a bit field indicating the first cell comprises a primary cell (PCell) or a primary secondary cell (PSCell) and the second cell comprises a secondary cell (SCell).

5. The method of claim 1,
   wherein:
      the transmitting the second PUCCH communication comprises transmitting the second PUCCH communication after the receiving the second subset of PDSCH communications.

6. The method of claim 1, further comprising:
   receiving, from the network unit, an indicator indicating a number of PDSCH communications in the first subset of the multiple PDSCH communications.

7. The method of claim 1, further comprising:
   receiving, from the network unit, an indicator indicating a number of transport blocks (TBs) in the first subset of the multiple PDSCH communications.

8. The method of claim 1, wherein the configuration indicates:
   at least one of first time resources, first frequency resources, or first beam resources associated with the first PUCCH communication; and
   at least one of second time resources, second frequency resources, or second beam resources associated with the second PUCCH communication.

9. The method of claim 1, wherein the configuration indicates at least one of:
   a first time offset from the single PDCCH communication to the first PUCCH communication; or
   a second time offset from the single PDCCH communication to the second PUCCH communication.

10. The method of claim 1, wherein the configuration indicates at least one of:
    a first time offset from the single PDCCH communication to the first PUCCH communication; or
    a second time offset from the first PUCCH communication to the second PUCCH communication.

11. The method of claim 1, further comprising:
    receiving, from the network unit on a semi-static basis, one or more indicators identifying the first cell and the second cell.

12. The method of claim 1, further comprising:
    receiving, from the network unit in downlink control information (DCI) via the single PDCCH communication, an identifier identifying the first cell and the second cell.

13. A method of wireless communication performed by a network unit, the method comprising:
    transmitting, to a user equipment (UE) via a single physical downlink control channel (PDCCH) communication, a configuration scheduling multiple physical downlink shared channel (PDSCH) communications;
    transmitting, to the UE, a first subset of the multiple PDSCH communications;
    receiving, from the UE via a first cell, a first physical uplink control channel (PUCCH) communication comprising acknowledgement/negative acknowledgement (ACK/NACK) feedback associated with the first subset of the multiple PDSCH communications after transmitting the first subset of PDSCH communications;

transmitting, to the UE, a second subset of the multiple PDSCH communications after receiving the first PUCCH communication; and receiving, from the UE via a second cell, a second PUCCH communication comprising ACK/NACK feedback associated with the second subset of the multiple PDSCH communications, wherein the second cell is different from the first cell.

14. The method of claim 13, wherein:

the transmitting the configuration comprises transmitting the configuration in downlink control information (DCI) via the single PDCCH communication; and the receiving the first PUCCH communication comprises receiving the first PUCCH before receiving the second PUCCH based on a latency budget associated with the first subset of the multiple PDSCH communications.

15. The method of claim 13, wherein:

the receiving the second PUCCH communication comprises receiving the second PUCCH after the transmitting the second subset of PDSCH communications.

16. A user equipment (UE) comprising:

a memory;

a transceiver; and at least one processor coupled to the memory and the transceiver, wherein the UE is configured to:

receive, from a network unit via a single physical downlink control channel (PDCCH) communication, a configuration scheduling multiple physical downlink shared channel (PDSCH) communications;

receive, from the network unit, a first subset of the multiple PDSCH communications;

transmit, to the network unit via a first cell, a first physical uplink control channel (PUCCH) communication comprising acknowledgement/negative acknowledgement (ACK/NACK) feedback associated with the first subset of the multiple PDSCH communications after the receiving the first subset of PDSCH communications;

receive, from the network unit, a second subset of the multiple PDSCH communications after transmitting the first PUCCH communication; and transmit, to the network unit, via a second cell, a second PUCCH communication comprising ACK/NACK feedback associated with the second subset of the multiple PDSCH communications, wherein the second cell is different from the first cell.

17. The UE of claim 16, wherein the UE is further configured to receive the configuration in downlink control information (DCI) via the single PDCCH communication.

18. The UE of claim 16, wherein the UE is further configured to transmit the first PUCCH communication before transmitting the second PUCCH communication.

19. The UE of claim 16, wherein the configuration comprises a bit field indicating the first cell comprises a primary cell (PCell) or a primary secondary cell (PSCell) and the second cell comprises a secondary cell (SCell).

20. The UE of claim 16, wherein the UE is further configured to:

transmit the second PUCCH communication after the receiving the second subset of PDSCH communications.

21. The UE of claim 16, wherein the UE is further configured to:

receive, from the network unit, an indicator indicating a number of PDSCH communications in the first subset of the multiple PDSCH communications.

22. The UE of claim 16, wherein the UE is further configured to:

receive, from the network unit, an indicator indicating a number of transport blocks (TBs) in the first subset of the multiple PDSCH communications.

23. The UE of claim 16, wherein the configuration indicates:

at least one of first time resources, first frequency resources, or first beam resources associated with the first PUCCH communication; and at least one of second time resources, second frequency resources, or second beam resources associated with the second PUCCH communication.

24. The UE of claim 16, wherein the configuration indicates at least one of:

a first time offset from the single PDCCH communication to the first PUCCH communication; or a second time offset from the single PDCCH communication to the second PUCCH communication.

25. The UE of claim 16, wherein the configuration indicates at least one of:

a first time offset from the single PDCCH communication to the first PUCCH communication; or a second time offset from the first PUCCH communication to the second PUCCH communication.

26. The UE of claim 16, wherein the UE is further configured to:

receive, from the network unit on a semi-static basis, one or more indicators identifying the first cell and the second cell.

27. The UE of claim 16, wherein the UE is further configured to:

receive, from the network unit in downlink control information (DCI) via the single PDCCH communication, an identifier identifying the first cell and the second cell.

28. A network unit comprising:

a memory;

a transceiver; and at least one processor coupled to the memory and the transceiver, wherein the network unit is configured to:

transmit, to a user equipment (UE) via a single physical downlink control channel (PDCCH) communication, a configuration scheduling multiple physical downlink shared channel (PDSCH) communications;

transmit, to the UE, a first subset of the multiple PDSCH communications;

receive, from the UE via a first cell, a first physical uplink control channel (PUCCH) communication comprising acknowledgement/negative acknowledgement (ACK/NACK) feedback associated with the first subset of the multiple PDSCH communications after transmitting the first subset of PDSCH communications;

transmit, to the UE, a second subset of the multiple PDSCH communications after receiving the first PUCCH communication; and receive, from the UE via a second cell, a second PUCCH communication comprising ACK/NACK feedback associated with the second subset of the multiple PDSCH communications, wherein the second cell is different from the first cell.

29. The network unit of claim 28, wherein the network unit is further configured to:
- transmit the configuration in downlink control information (DCI) via the single PDCCH communication; and
- receive the first PUCCH before receiving the second PUCCH based on a latency budget associated with the first subset of the multiple PDSCH communications.

30. The network unit of claim 28, wherein the network unit is further configured to:
- receive the second PUCCH after the transmitting the second subset of PDSCH communications.

* * * * *